(12) United States Patent
Belali et al.

(10) Patent No.: US 8,244,861 B2
(45) Date of Patent: *Aug. 14, 2012

(54) NETWORK EVENT NOTIFICATION AND DELIVERY

(75) Inventors: Mohamed Belali, Issaquah, WA (US); Cort Whitney Stinnett, Sammamish, WA (US); Clark D. Nicholson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,882

(22) Filed: Feb. 18, 2011

(65) Prior Publication Data

US 2011/0138210 A1  Jun. 9, 2011

Related U.S. Application Data

(63) Continuation of application No. 11/330,965, filed on Jan. 11, 2006, now Pat. No. 7,895,309.

(51) Int. Cl.
*G06F 15/173* (2006.01)
*G06F 1/00* (2006.01)
*G06F 1/26* (2006.01)
*G06F 15/16* (2006.01)

(52) U.S. Cl. ......... 709/224; 713/300; 713/320; 709/200

(58) Field of Classification Search ........... 709/224–225
See application file for complete search history.

(56) References Cited

U.S. PATENT DOCUMENTS

| | | | |
|---|---|---|---|
| 6,067,561 A | 5/2000 | Dillon | |
| 6,442,241 B1 | 8/2002 | Tsumpes | |
| 6,591,279 B1 | 7/2003 | Emens | |
| 6,665,721 B1 | 12/2003 | Hind | |
| 6,711,154 B1 | 3/2004 | O'Neal | |
| 6,782,472 B2 | 8/2004 | Jain | |
| 2001/0003828 A1 | 6/2001 | Peterson | |
| 2002/0104095 A1 | 8/2002 | Nguyen | |
| 2002/0162024 A1 | 10/2002 | Cunchon | |

(Continued)

FOREIGN PATENT DOCUMENTS

JP    2006338417    12/2006

(Continued)

OTHER PUBLICATIONS

Unified Messaging, article http://www.mobilein.Icom/unified_messaging.htm.

(Continued)

*Primary Examiner* — Haresh N Patel
*Assistant Examiner* — Evans Desrosiers
(74) *Attorney, Agent, or Firm* — Workman Nydegger

(57) ABSTRACT

Described are a main host system of the client computer, and a network event notification system, including a networking subsystem that communicates with a network server to act as a proxy for the client computer when the main host system of the client computer is in a sleep state. The networking subsystem may await a synchronization packet initiated by the network server, or may occasionally poll the network server to determine whether data is available. To this end, the computing device operates an associated network subsystem while the main host system of the computing device is in a sleep state, and receives data via the network subsystem indicating that content is available to the computing device. Policy is then invoked policy to determine whether to wake at least part of the main host system to handle the content. A target duty cycle mechanism is also provided to control the average power consumption during wake and sleep cycling.

18 Claims, 14 Drawing Sheets

U.S. PATENT DOCUMENTS

| | | |
|---|---|---|
| 2002/0174184 A1 | 11/2002 | Bouchard |
| 2003/0126216 A1 | 7/2003 | Avila |
| 2003/0225782 A1 | 12/2003 | MucFaden |
| 2004/0128310 A1 | 7/2004 | Zmudzinski |
| 2004/0133651 A1 | 7/2004 | Chopra |
| 2005/0044430 A1 | 2/2005 | Cheshire |
| 2005/0057341 A1 | 3/2005 | Roesner |
| 2005/0089019 A1 | 4/2005 | Salim |
| 2005/0120255 A1 | 6/2005 | Padawer |
| 2005/0125553 A1 | 6/2005 | Wu |
| 2006/0187900 A1 | 8/2006 | Akbar |
| 2006/0265473 A1 | 11/2006 | Muto |
| 2006/0294407 A1 | 12/2006 | Rothman |
| 2007/0078959 A1 | 4/2007 | Ye |

FOREIGN PATENT DOCUMENTS

| | | |
|---|---|---|
| WO | WO0159998 | 8/2001 |

OTHER PUBLICATIONS

Outlook Mobile Access (OMA) in Exchange Server 2003 article, http://www.msexchange.org/tutorials/OMA_Exchange_Server_2003.html.

M-IMAP article, http:www.access-sys-eu.com/m-imap.html.

Mobile Email Solution article, http://www.Sunday.com/portal/common/multi_section.jsp?fldr_id=907.

Li Li, Wu Chou, Dan Zhou, Feng Liu, Avaya Labs. Res., Avaya Inc., Basking Ridge, NY, USA; a flexible architecture for Web service enablement of communication services; 2007.; The Institution of Engineering and Technology.; 2008029.

U.S. Appl. No. 11/330,965, filled Nov. 17, 2008, Office Action.

U.S. Appl. No. 11/330,965, filed Apr. 16, 2009, Office Action.

U.S. Appl. No. 11/330,965, filed Aug. 31, 2009, Office Action.

U.S. Appl. No. 11/330,965, filed Feb. 19, 2010, Office Action.

U.S. Appl. No. 11/330,965, filed Jun. 9, 2010, Office Action.

U.S. Appl. No. 11/330,965, filed Nov. 26, 2010, Notice of Allowance.

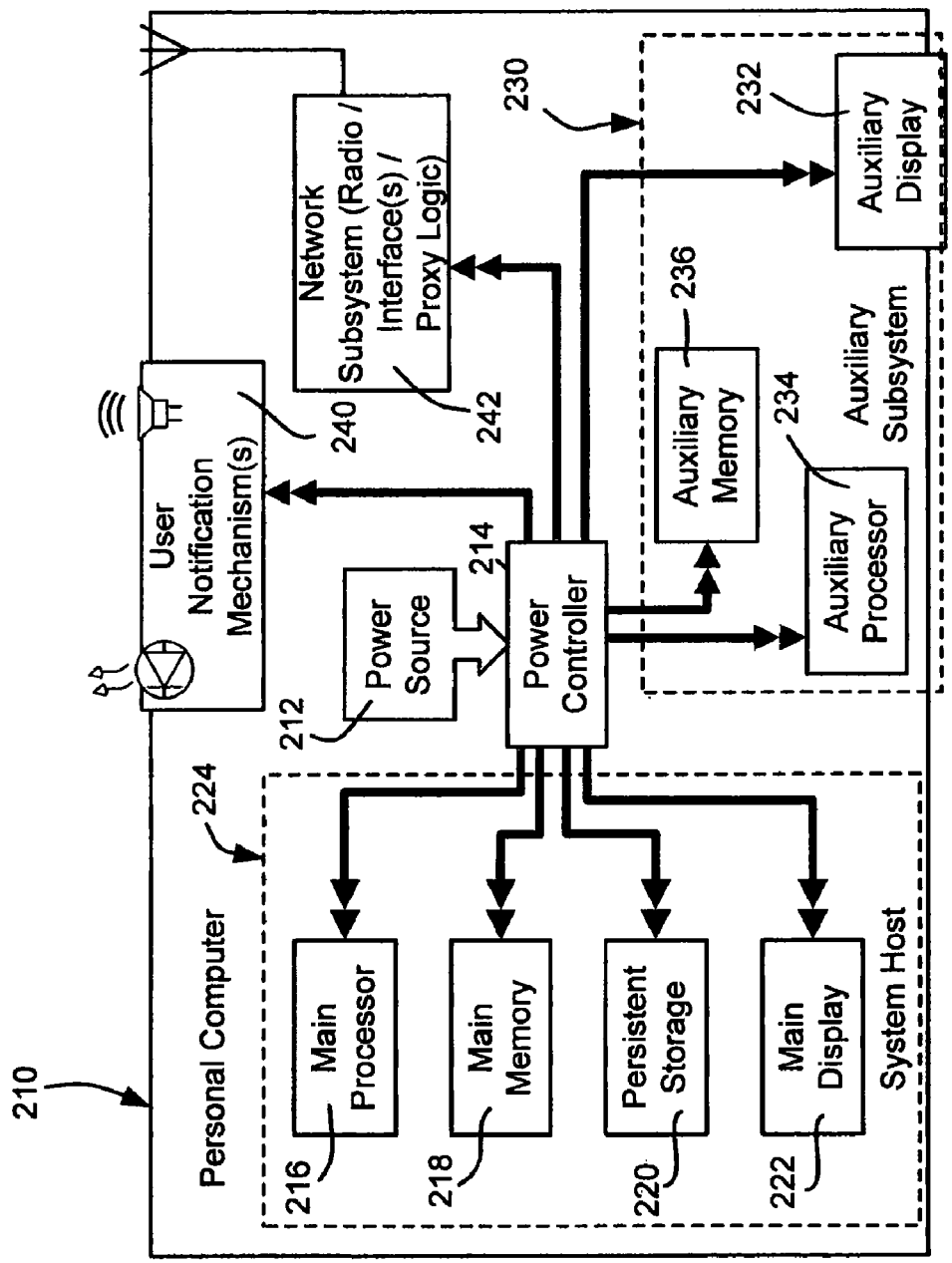

NETWORK EVENT NOTIFICATION AND DELIVERY

CROSS-REFERENCE TO RELATED APPLICATIONS

This application is a continuation of application Ser. No. 11/330,965, filed Jan. 11, 2006, and entitled "NETWORK EVENT NOTIFICATION AND DELIVERY", which is incorporated by reference herein in its entirety.

BACKGROUND

Wireless connectivity has become widely available to users of computing devices. For example, in malls, airports, fast food and coffee shops, computer users are surrounded by WiFi hotspots. Device users that are moving and not capable of remaining within a given hotspot are still surrounded by cellular networks, such as GPRS (General Packet Radio Service), Edge, EV-DO (Evolution Data Only) and UMTS/HSDPA (Universal Mobile Telecommunications System/High-Speed Downlink Packet Access). Further, WiMax, a standards-based, long-distance wireless technology for high-throughput broadband connections, is in early deployment and will be available in the near future. As a result, mobile computer users are able to communicate in many ways and from many possible locations.

However, when a mobile personal computer is in a reduced power state, (for example, in a "standby" mode sleep state where essentially a small amount of power persists volatile memory contents), such as when being carried in a carrying case, the computer is not able to perform any useful functionality. In many circumstances, a user cannot easily stop and restore the computer to normal operation (exit the computer's standby state) simply to check whether a communication has been received, or perform some other needed action. While some mobile computer users also carry a small, essentially "always-on" communication device that can receive email and other messages, such as in cellular phones and the like, these devices are limited, and are generally only good for relatively simple message receipt and replies. Such limited devices are not adequate in many situations where the full richness of application programs and services of a personal computer are needed or desired.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a main host system of the client computer, and a network event notification system, including a networking subsystem that communicates autonomously with one or more network servers to act as a proxy for the client computer when the main host system of the client computer is in a sleep state. The networking subsystem may await a synchronization packet initiated by the network server, or may occasionally poll the network server to determine whether data is available.

To this end, in one example implementation, the computing device operates a bidirectional communication session by an associated networking subsystem while the main host system of the computing device is in a sleep state, and receives data via the networking subsystem indicating that content is available to the computing device. The computing device effectively establishes a network presence while in a sleep state thereby allowing network resources to locate and serve the device while allowing the computing device to make network request. Policy may then be invoked to determine whether to wake all or part of the main host system to handle the event or content, or whether the event/content can be handled autonomously without waking the system. The event/content may be handled autonomously without waking the system or manually by the user based on notification of an event and/or subset of content.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 2A is a block diagram representing an example configuration of components and selective power control thereof for network event handling, including while a main host system is in a sleep state.

DETAILED DESCRIPTION

Exemplary Operating Environment

Figure 1:
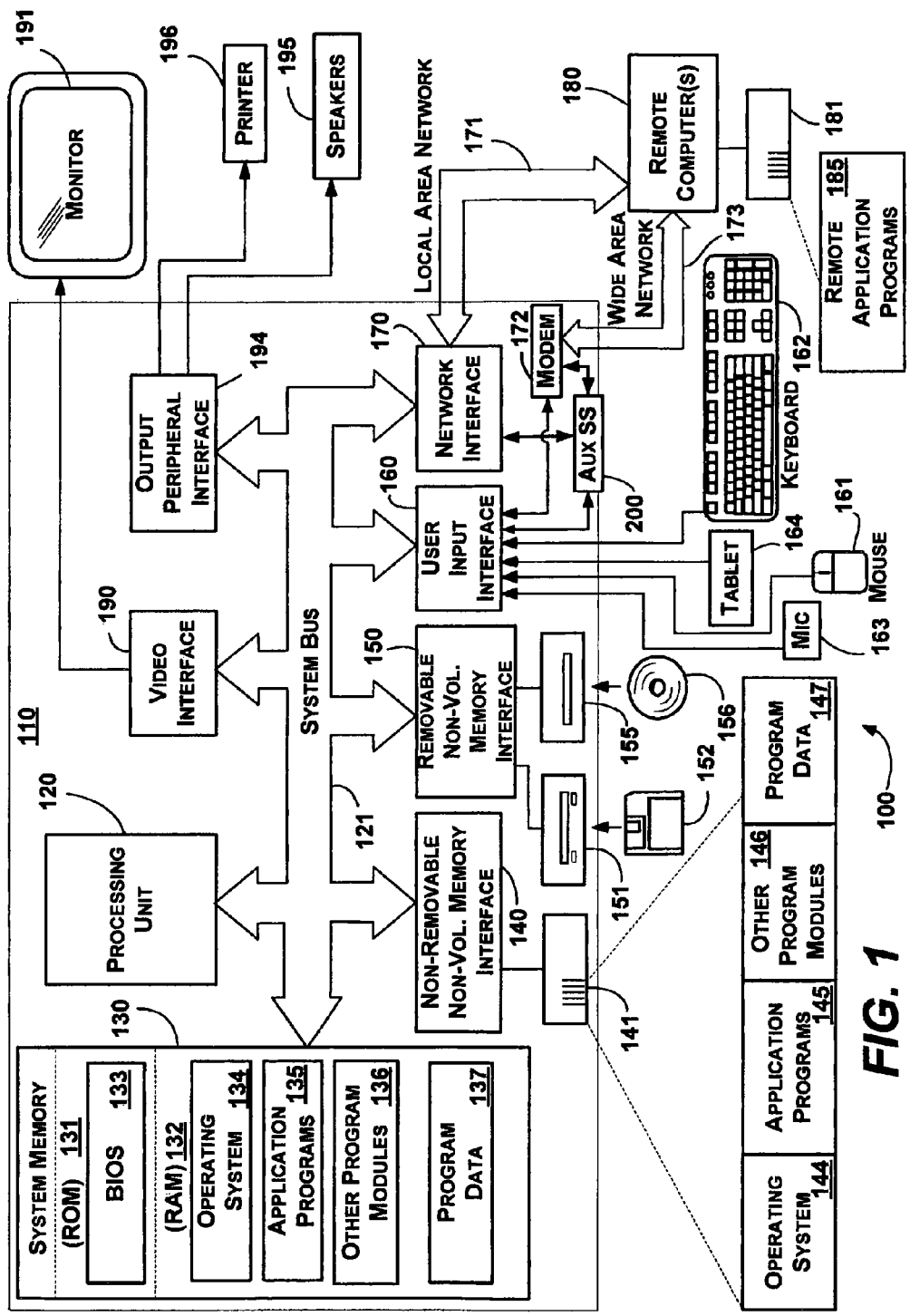
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

An auxiliary display subsystem 200 may be connected via the user interface 160 to allow system status and event notification to be provided to the user even if the system is in a low power state. The auxiliary display subsystem 200 may be connected to the modem 172 and/or network interface 170 to allow communication between these systems while the main processing unit 120 is in a low power state.

Mobile Network Event Notification

Various aspects of the technology described herein are directed towards a delivery and notification system for a mobile personal computer, including real-time notification and delivery of content such as email messages, but also may include other network event notifications and content such as program updates and delivery over wired networks. In general, the mobile personal computer is typically a laptop, tablet or notebook device running a general-purpose operating system, such as a Microsoft Windows®-based operating system, but also includes any other device or devices capable or running a relatively rich set of application programs and services, including desktop computers and reasonably powerful hand-held devices.

Further, such personal computers are of the types that enter a reduced-power state, typically to preserve battery life, when not in use. For example, to save battery power, the personal computer may be placed into a reduced-power sleep state according to the ACPI standard, e.g., standby or hibernate, including when the main computer system components are completely powered down. Notwithstanding, the present invention is not limited to any currently defined and/or standardized reduced power/sleep states, but may operate at times in various other types of states with respect to which of its components are operational at any given time. Thus, as use herein, "sleep" and its variants (e.g., "sleeping") apply to any reduced power/functionality states, and are not limited to any current definitions or standards such as those corresponding to ACPI-defined states.

Likewise, the present invention is not limited to any of the examples used herein. For example, various aspects of the technology described herein are generally directed towards a server communicating with a client via a network subsystem that acts as proxy for the client computer when the main host system of the client computer is in a sleep state. Many of the examples and descriptions used herein correspond to an email server and communication to an email client (proxy) regarding available email content and/or calendar events. However, other usage scenarios correspond to other types of proxy clients, such as instant messaging clients, Session Initiation Protocol (SIP) clients, automatic program and patch distribution (e.g., corporate updates), VoIP clients, website change notifications such as based on RSS (Really Simple Syndication), location based services where the client in the sleep state is capable of supplying location data to the network, and virtually any network-related event (such as to notify a network administrator of a networking issue). Thus, the present invention is not limited any of the examples herein such as email, but rather may be used various ways that provide benefits and advantages in computing in general, Turning to FIG. 2A of the drawings, there is represented an example embodiment in which a personal computer 210 (such as a mobile personal computer based on the computer system 110 of FIG. 1) provides functionality while in a reduced power sleep state, e.g., a sleep state such as based upon the ACPI S3 state, including while in a carrying case. Note that the connections between the example components of FIG. 2A represent example power connections. Thus, in FIG. 2A, a power source 212 provides power to a power controller component 214 which can selectively (e.g., via a power settings policy) power on and power off other components, including a main processor 216, main (RAM) memory 218, persistent storage 220 and main display 222. The main processor 216, main (RAM) memory 218, persistent storage 220 and main display 222 may be considered to comprise part of a host system 224 that is capable of entering a sleep state. For example, when the host system 224 is in an S3-like sleep state, the main processor 216 and persistent storage 220 (e.g., hard disk drive) are powered down, at least to an extent, while the main memory 218 continues to receive sufficient power to maintain its volatile contents.

An auxiliary subsystem 230, including an auxiliary display 232 (e.g., in form of an LCD or OLED screen, or simple LED, sometimes referred to as an edge-display if it is positioned on the edge of a laptop) may be present on a given system. Optionally, the auxiliary subsystem 230 may include an auxiliary processor 234 and/or an auxiliary memory 236. Thus, an auxiliary display may be present without an auxiliary processor and/or auxiliary memory, and instead be controlled by the main processor 216 (or another means such as code running on a network subsystem); if so, the content rendered on the auxiliary display 236 may be persisted even when the main processor 216 is powered down. The auxiliary display module may be capable of entering into a lower power sleep state that is either controlled by the main computer system or controlled independently by the auxiliary processor. Note that the power controller 214 is shown as being coupled to the components of the auxiliary subsystem 230, but an auxiliary power source is alternatively feasible, so that, for example, the auxiliary subsystem 230 may remain operational regardless of the state of the main computer system, and/or does not drain the main computer system's battery. The auxiliary subsystem 230 also may be a separate module external to and/or removable from the PC and have its own power source. The auxiliary system may plug into the main computer 210 and charge its power source from the main computer.

In one example implementation, the personal computer 210 may receive a server notification while in a sleep state, such as regarding an available email, and notify the user and/or computer when received so that an appropriate action can be taken. One or more user notification mechanisms 240 may be provided for this purpose; to alert the user the notification mechanisms 240 may selectively receive constant or intermittent power from the power controller 214 (or another source), including when the personal computer 210 is in a sleep state. Alternatively, the personal computer 210 may receive a server notification and take some action without requiring user notification or interaction.

To receive a server-initiated notification (also referred to herein as a synchronization packet) when the personal computer 210 is in a sleep state, a sufficient amount of power flows to the device's networking subsystem 242, on at least an occasional basis. Note that the block representing the network subsystem 242 in FIG. 2A also represents one or more interfaces, including by which the module 242 can wake the personal computer 210 and/or auxiliary subsystem 230, as generally described below. In this example, the networking subsystem 242 has sufficient processing power and memory to run as a standalone subsystem while the main processor 216 is in a low/power off state.

In general, whenever powered, the networking subsystem 242 listens for incoming synchronization packets when operating in a first alternative, referred to as a push mode (because the server pushes the synchronization packets). When a synchronization packet is received, the networking subsystem 242 processes the packet, and based on the packet may trigger a special system wakeup event for the system to further process the packet and/or any related message. For example, a sleeping host system 224 may be woken up to a state in which it is capable of processing messages, whereby the system 224 may receive an email message header or full email contents, and take some action based thereon; the system 224 may notify the user (e.g., if the message meets a user-configured policy as described below) by issuing a perceptible output, e.g., a user-predefined tone or a natural language output of the information, a visual indicator, and/or other tactile feedback such as vibration. Notifications thus may be as simple as an LED, beep, or vibration, but also may be more complex and include message header information, such as source, subject, and time data that is written to an auxiliary display or read to the user in natural language. Note the various visual, audible, and vibration notifications may be changed based on the type of communication or sender.

Further, the wake event corresponding to a received synchronization packet is special compared to other wake events, so that the personal computer 210 knows that it was not a user-initiated wake event (e.g., corresponding to a laptop lid being opened), and thus may return to a sleep state. Note that before returning to its sleep state, the personal computer may delay briefly, e.g., for a few seconds, in anticipation of the user wanting to interact with the full host system directly following the user notification.

In an alternative push mode implementation, the network subsystem 242 receives a synchronization packet from the server, but instead of waking the personal computer 210 it communicates directly with the auxiliary display subsystem 230. In this example, the auxiliary display subsystem is capable of converting the character representation of information received from the server into human readable fonts in various languages.

By way of example of how a synchronization packet may benefit a user, consider a worker traveling in a taxicab on the way to a client. Before the worker had to leave the office to take the taxicab, the worker's boss was making some last minute changes to a presentation that the worker will be making to the client. However, the boss was unable to complete the changes in time. While in the cab, the worker's laptop is in a "standby"-like sleep mode. Without intervention by the worker, the laptop wakes up and receives an email notification (synchronization packet) from the corporate email server, followed by the email message and downloaded content; (note that via policy, the server may not push synchronization packets for all messages, and/or the personal computer may not notify the user and/or download content for all messages, such as any messages deemed unimportant). In this example, the synchronization packet and corresponding message meets the wake policy, and thus the message is received, the laptop processes the message to some extent and generates an audible notification, and thereafter will return to its sleep state.

In the present example, because of the user notification, the worker knows that the revised presentation was delivered or likely delivered, e.g., by an auxiliary display, and/or by a user-configured policy that limits notifications to messages only from certain senders. Thus the user will open the laptop when convenient to review the presentation. For example, via the rich capabilities of the laptop computer, the worker is able to review the presentation, and make changes by exchanging/collaborating with his boss, all while in the taxicab.

In one alternative implementation, instead of a wakeup event upon receipt of a synchronization packet, the network subsystem 242 may wake up on occasion, e.g., at predefined timer intervals, to check for content in a "poll" mode and act on any available content, such as to notify the user if there is some user-directed content that matches policy. The network subsystem 242 may then wake the personal computer system 210 if appropriate.

In yet another alternative implementation, the personal computer 210 may wake on occasion, e.g., at predefined timer intervals, to check for content in a "poll" mode and act on any available content, such as to notify the user if there is some user-directed content that matches policy. For example, with the technology described herein, a personal computer 210 may be configured wake up every hour to synchronize a user's email inbox and calendar, as well as to notify the user of any new relevant emails and/or calendar events.

To operate the poll model in one example implementation, an application/service runs on the personal computer 210, and via a user-defined time schedule (e.g., interval), the personal computer 210/network subsystem 242 wakes to check for server notifications and/or new content. If no server data is present, the personal computer 210/network subsystem 242 returns to a reduced-power state and waits for the next wake event to occur. In such a situation, the user is typically unaware of any temporary wake activity that took place.

If polling indicates that content for the user is available, the corresponding content may be downloaded, at least to an extent. For example, if the server notification corresponds to a new mail message, mail header information may be downloaded to the computer system, including writing the header information to an auxiliary display, if one is present, and/or otherwise (e.g., audibly) notifying the user. Alternatively, the message or other content may be downloaded in whole or part, such as depending on user-defined download policy. Typically, the personal computer 210 will issue a user notification before returning to a reduced-power state, however the user may selectively activate such a feature, e.g., so as to not have an audible alert or visual alert occur in a quiet environment or when privacy is needed. As described above, a user notification may correspond to an audible, visible, and/or otherwise human perceptible event (e.g., tactile vibration), and the user notification may be persisted or occasionally repeated. For example, via auxiliary power, an LED may remain driven, and/or an audible alert/vibration may be issued, even when the host system 224 is in the reduced power-state, including completely off.

To summarize, after the scheduled wakeup, the personal computer 210 will then return to its reduced-power sleep state. Note that as mentioned above, if a user notification was issued, the personal computer 210 may briefly delay before reentering sleep (e.g., for a few seconds) to allow for user interaction corresponding to the notification. This may include voice command and control to request that the incoming notification be read again in natural language or read in further detail, such as to read the body of the email. Further, note that once returned to the reduced-power sleep state, if a notification was provided, the otherwise sleeping personal computer 210 may continue to alert the user, e.g., via a steady or flashing LED, occasional or steady audible tone, auxiliary display and/or the like such that the user can perceive the alert in some way following the wake/sleep cycle. If for example, multiple emails or email headers were downloaded during the poll event and an auxiliary display is used for notification, the user will be able to view notifications, e.g., individually or more than one at a time.

Figure 2B:
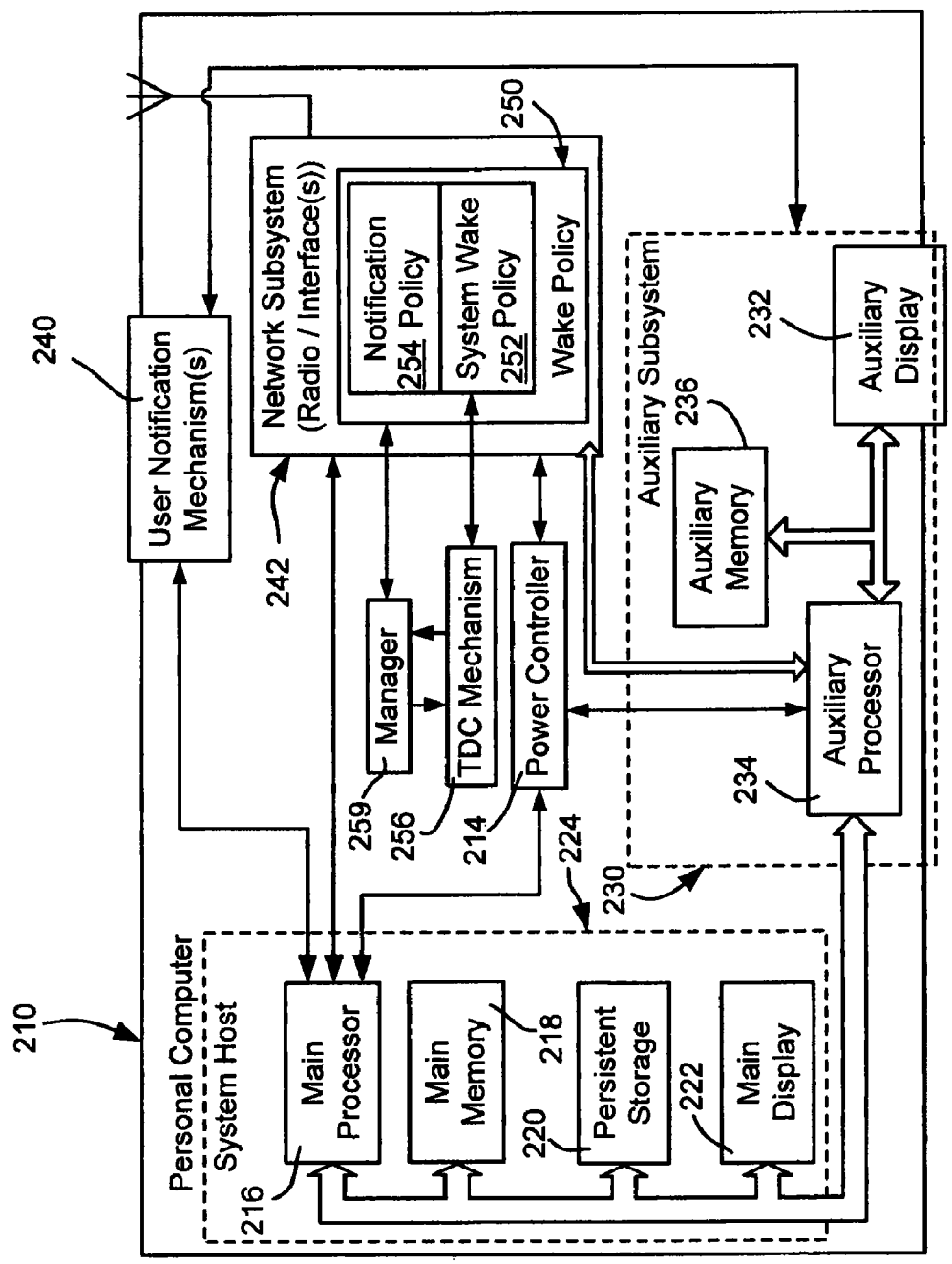
FIG. 2B is a block diagram representing an example configuration of components and communication for network event handling.

FIG. 2B is block diagram having components generally like those of FIG. 2A, to exemplify communication between components (rather than power connections as in FIG. 2A). In addition to the components represented in FIG. 2A, FIG. 2B includes a policy component 250 that, for example, resides in network subsystem memory as well as the system non-volatile memory, and/or may exist on the server, and among other decisions determines whether the personal computer is allowed to wake, that is, under what circumstances.

One type of policy depicted in the example of FIG. 2B comprises system wake policies 252, such as policies that determine whether to wake based on an evaluation of current battery levels, current thermal conditions and so forth. For example, when the battery is at a critically low level, the personal computer 210 may not be awakened while in a sleep state; the network subsystem 242 also may be shut down, whether the personal computer is configured to operate in the poll mode, the push mode, or some other operating mode (e.g. a hybrid mode, described below). Similarly, if the personal computer is sensed as being too warm, such as while being carried in a bag where there is little if any ventilation, the personal computer 210 may not be awakened while in a sleep state, and/or the network subsystem 242 also may be shut down, until a lower temperature is sensed. One example mechanism for implementing such policies is referred to herein as a target duty cycle mechanism 256, (which communicates with an event notification subsystem manager 259), described below.

Another type of policy depicted in FIG. 2B comprises user-configured notification policies 254. Note that such policies are not necessarily configured by the user, but instead may be configured by default, by an administrator, by an automated process and so forth. User-configured notification policies 254 are generally directed towards content/source-based and other selective filtering, such as when the user is to be notified, which sender's emails are important, how often the system should wake to check for new content (poll mode), and how frequently the system should awaken on a synchronization packet detection (push mode). For example, even if regularly powered awaiting a possible synchronization packet, the network subsystem 242 may be configured to wait for a threshold time interval and/or threshold number of synchronization packets before waking the host system 224, so that the host system 224 is not changing between sleep and wake states too frequently.

In summary, there are various ways described above to implement network notification and delivery to a computer system which is in a reduced-power state. As also described above, these include a poll mode, in which the personal computer or network subsystem 242 occasionally (e.g., periodically according to some defined policy) wakes up and checks for a notification, and a push mode, in which a remote server sends a short message, e.g., in the form of a specialized packet, that can notify the user on an auxiliary display and/or wake up the system and thereafter (possibly) download content. Yet another mode comprises a hybrid model, in which a remote server sends a message to a different device, such as a pocket-sized, always on device (e.g., a user's Smartphone, Personal digital assistant or the like or other communication device), which in turn sends a wake event, typically a wireless event, to wake the personal computer.

As also generally described above, in any mode, including the pull mode, poll mode and hybrid mode, notifications or available content may be filtered by policy. Policy may be applied at the server to avoid sending a notification for a certain type of content, or to hide the existence of certain available content, at least for awhile. Policy may be applied at the personal computer to ignore certain content and/or block notification to the user. Note that policy also may be applied at some intermediary transmitter, or at any combination of machines that act on the content. In this manner, for example, email messages deemed junk email, and/or messages not sent from a particular user or set of users, will not result in a user notification and/or system wakeup during the host system's sleep state.

Figure 3:
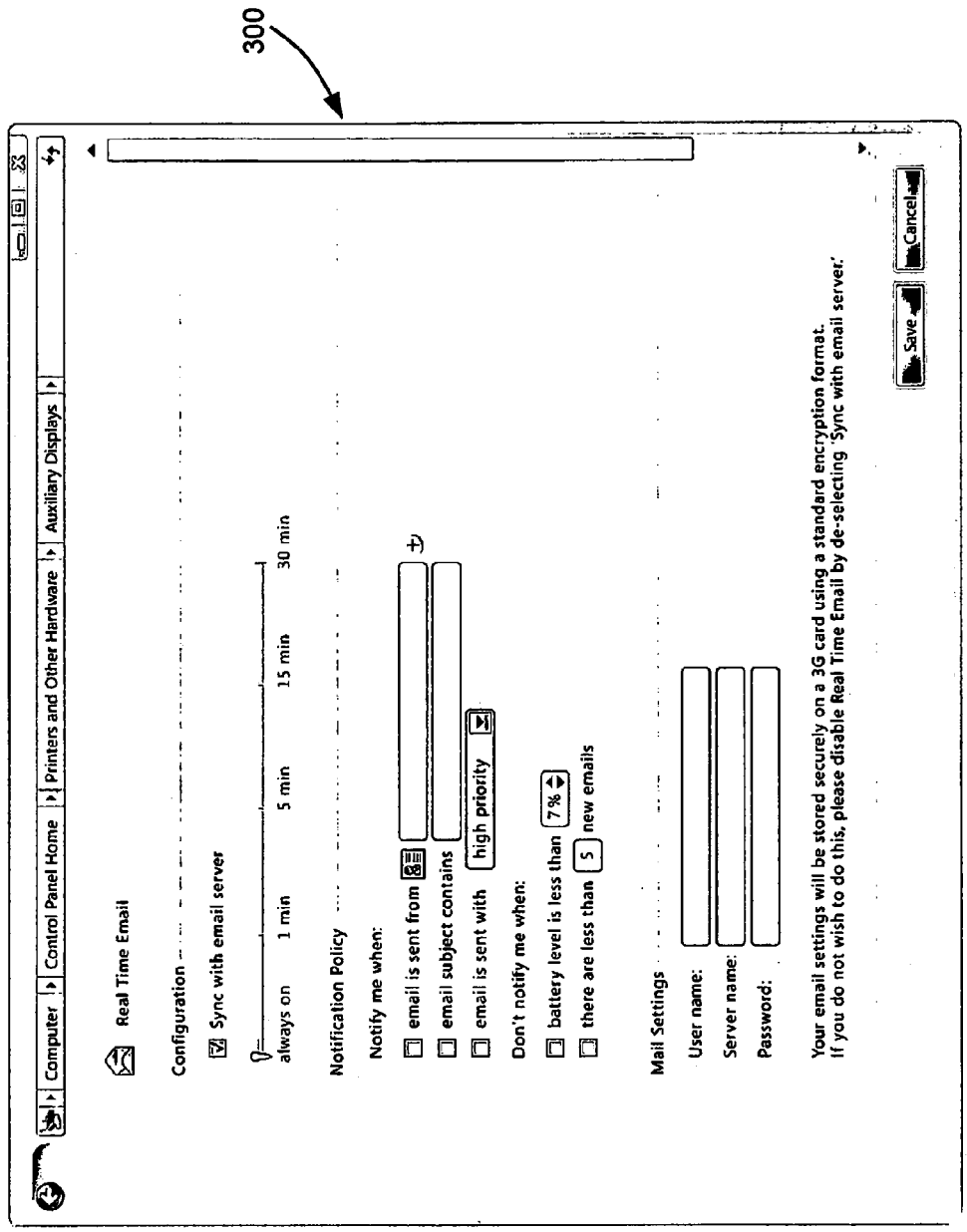
FIG. 3 is a representation of a user interface that may be used to configure policy and other settings for network event handling.

By way of example, FIG. 3 shows an example user interface 300 by which the user may configure some or all of the user wake policy 254 for email messages. In general, the user interface 300, which may be incorporated in a COM API or the like, serves as a network subsystem configuration interface to expose configuration such as, mail configuration, rules configuration and disabling/enabling of notifications. As represented in the example user interface 300, the user can selectively control notifications based on the sender, content, priority level, power level and number of emails that are available. The user can also select an always on (e.g., push mode) synchronization setting, or select a network subsystem powering (e.g., pull or push mode) time interval. As is understood, these are only examples, and many other operating states/filtering criteria are feasible. For example, a user interface may be provided that allows selection of one or more types of notification, such as to ensure a subtle alarm so as not to attract attention, e.g., a single LED or small auxiliary display being illuminated rather than an audible alarm. In addition, the user may elect to lock the notification systems to prevent unauthorized persons from viewing or hearing that an event has occurred.

In general, an event notification subsystem configuration UI applet may be provided, to enable or disable the event notification, e.g., via a simple check box. If enabled, the applet configures features for direct push or poll modes, e.g., via mutually exclusive checkboxes. The user can select a poll mode and a wake interval, or a direct push mode. If not mutually exclusive, both modes may be checked, which, for example, may mean that the system will be checking for email (e.g., continuously), but if no email has been received and a timer has expired, the system will wake up and synchronize the user's mail and calendar, e.g., for mail and/or calendar data that may have been filtered and did not initiate a wake event.

For example, with respect to mail configuration, the applet may take input from the user or user's default mail client and pass it as parameters to a program running on the network subsystem. Such configuration may include a Username, Password, Server name, and any Encryption Certificate. Note that the actual mail server name and the network notification (e.g., ActiveSync®) mail server name are not likely the same; e.g., one may be referenced as a Netbios/host name in the mail program's configuration, while the other is a referenced as a URL so that it can be addressable over the Internet. The two names can be associated with a single set of physical server hardware, or with two different sets of server hardware, e.g., to have two servers, one of which is behind a company's firewall.

Rules are used as a quick way for the user to decide which notifications to receive when the event notification subsystem is enabled. For example, rules may include a battery threshold, such that the system will not to notify the user of emails if the battery is below a certain threshold of remaining power. Other rules are directed towards which emails will notify, e.g., notify when the user is the only one on the "to line," when email with high priority is received, and/or when emails from specific contact(s)/sender(s) are received. An email threshold may be specified, to determine how many emails are to be queued up before waking up the PC and/or notifying the user. These settings may be overridden based on superseding policies.

Hardware components that may be used to achieve desirable functionality include the auxiliary display subsystem 230 and the network subsystem. These components may be controllably powered or continually powered, as described above. One type of network subsystem corresponds to a "3G" (third-generation) wireless modem, which may be based on different architectures, including HSDPA (GSM-based), or an EV-DO (CDMA-based). WiFi, WiMAX (corresponding to 802.11 and 802.16 standards, respectively) and other types of wireless communications devices may also be controllably powered.

With respect to auxiliary displays, as is known, auxiliary displays allow for easily glance-able notifications. In one usage model, auxiliary displays generally serve as an intermediate tool that gives a user the ability to make a quick decision as to whether to wake up the PC to act on a received notification. For example, an auxiliary display provides a quick and easy way to glance at details corresponding to a notification to determine the notification's relevance, and if desired, respond to or take action regarding any received notifications.

Figure 4:
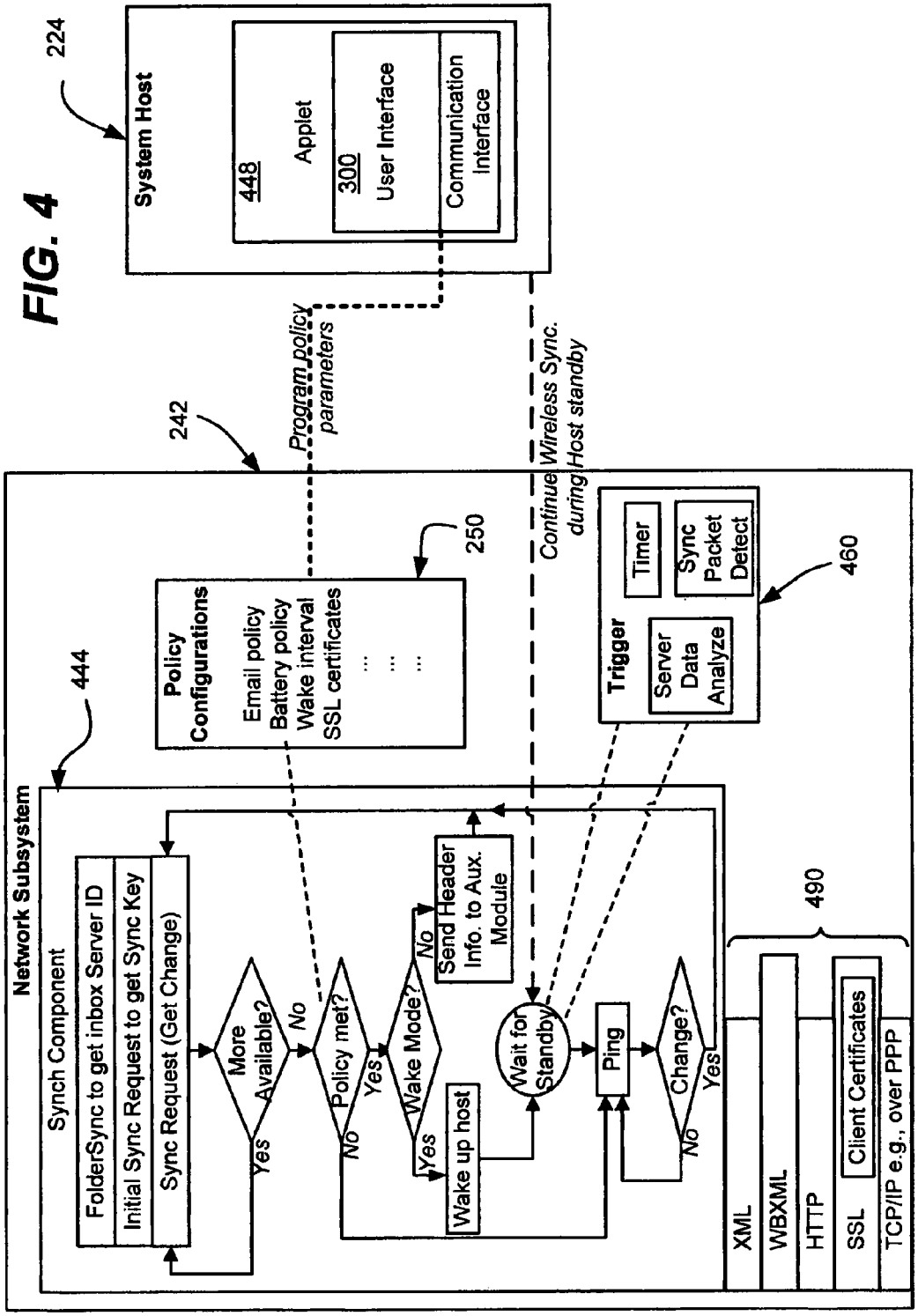
FIG. 4 is block diagram representing an example configuration of a networking subsystem and system host for network event handling.

FIG. 4 is an example representation of one example personal computer network subsystem 242; (for example, this could represent a wireless radio, interfaces, internal logic and related components) capable of acquiring server content, including while the main computing system is in a sleep state. As is understood, the network subsystem 242 includes components that may be implemented in virtually any way, such as directly on a motherboard, in an internal card, or in an add-on device connected in some way, such as via USB. In general, the network subsystem 242 needs to be able to interpret packets and/or content to some extent and support and run the appropriate communication protocols. As represented in FIG. 4, types of protocols and content formats 490 include XML, WBXML, HTTP, SSL, TCP/IP, as well as others not explicitly shown such as an ActiveSync® protocol (for communicating synchronization packets) and SMS.

A typical network subsystem 242 will receive and maintain configuration settings from the host personal computer 224, including data such as a username, server name and passwords, and also supports at least one SSL certificate. For security, configuration data may be stored on the module using an acceptable encryption format.

The example module 242 also includes a synchronization component 444 that receives, maintains and executes a policy applet comprising an application and policy configuration data 250 or the like that evaluates whether or not to wake up the host system 224. The system host 224 may provide a program such as implemented in a control panel applet 448 by which the user may invoke a user interface, such as the user interface 300 of FIG. 3, to configure the policy.

To operate in the push mode, the network subsystem 424 remains powered up and connected to the server (e.g., Internet/mail server such as a Microsoft® Exchange server) at least occasionally while the main personal computer (host system 224) is in a sleep state. This may be accomplished by keeping the network subsystem 242 powered using auxiliary voltage/current (VAux) to maintain a full functioning network subsystem. The trigger mechanism 460 represents means for interpreting the synchronization packet. The trigger mechanism 460 also represents the timer for controlled awakening of the module and or system host, such as when in the pull mode. The trigger mechanism 460 may also include means for performing any analysis on a synchronization packet's data and/or server content to determine whether to further process the server event based on the available information.

The host system 224 supports reacting to a wake event (such as "Wake on Remote USB") to wake up the host system 224 to receive and/or process content when server notifications are received at the network subsystem 242. The host system also distinguishes between special wake events triggered by the remote server synchronization packet (push mode) or the local timer notifications (e.g., poll mode) versus wake events trigged by the user. To this end, a special identifier, (which may be as simple as a single bit in a hardware register or a device identifier) is recognized by the host system.

When the special identifier is recognized, policy then determines the actions to take. For example, when the host system wakes on a special server notification received at the modem, it may only download email and calendar events, write notifications to the auxiliary display subsystem, and return to a sleep state which is typically (but not necessarily) the same state the host system was previously in. Policy controls the actual operation, however to conserve power, the personal computer may be configured such that no other tasks are performed during this wake mode.

Figure 5:
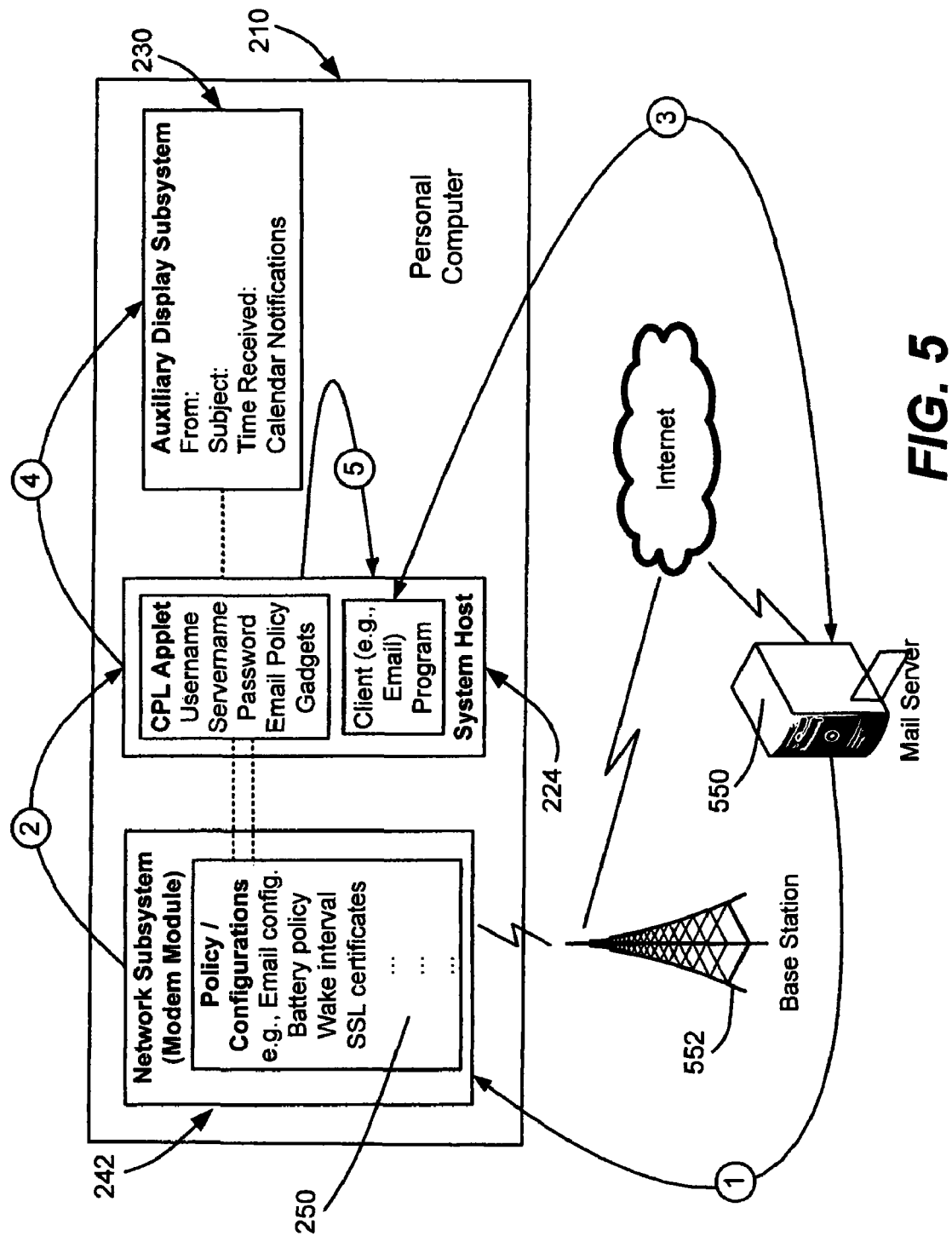
FIGS. 5-8 are representations of network event handling in an example email-based implementation that wakes the host PC.

The auxiliary display may be used as a quick mechanism by which a user may make a decision on whether or not immediate action is necessary, e.g. opening the laptop lid, reading email and/or replying to email. With respect to an email example, FIG. 5 shows an example communication pattern, as represented via the arrows labeled with circled numerals. In this example while the system is in a sleep state such as S3, a network subsystem 242 comprising a wireless modem module utilizes a wireless cellular data infrastructure, represented by a base station 552, to access a mail server 550, e.g., connected to the public Internet. The mail server 550 utilizes the same wireless infrastructure to push incoming email notifications (circled numeral one (1)) to the modem module. Based on the policy configurations 250, the modem module wakes the system host 224, such as to an S0 state as represented by circled numeral two (2)). While awake, a client mail program (gadget) downloads messages from the mail server 550 (circled numeral three (3)). The system host 224 writes notification data to an auxiliary display 230 (circled numeral four (4)), and returns to its sleep state (circled numeral five (5)). As can be seen, by providing power to a system's network subsystem and having an open receive channel, work may be accomplished while keeping power consumption very low, e.g., by providing power to only those components that are necessary complete a task. Such "wake on wireless management events" may be handled via a listening mode in which the system remains available to receive messages from the outside world, and a reacting mode, where the system responds to perform a specific operation such as retrieving email from a mail server and/or notifying the user.

Figure 6:
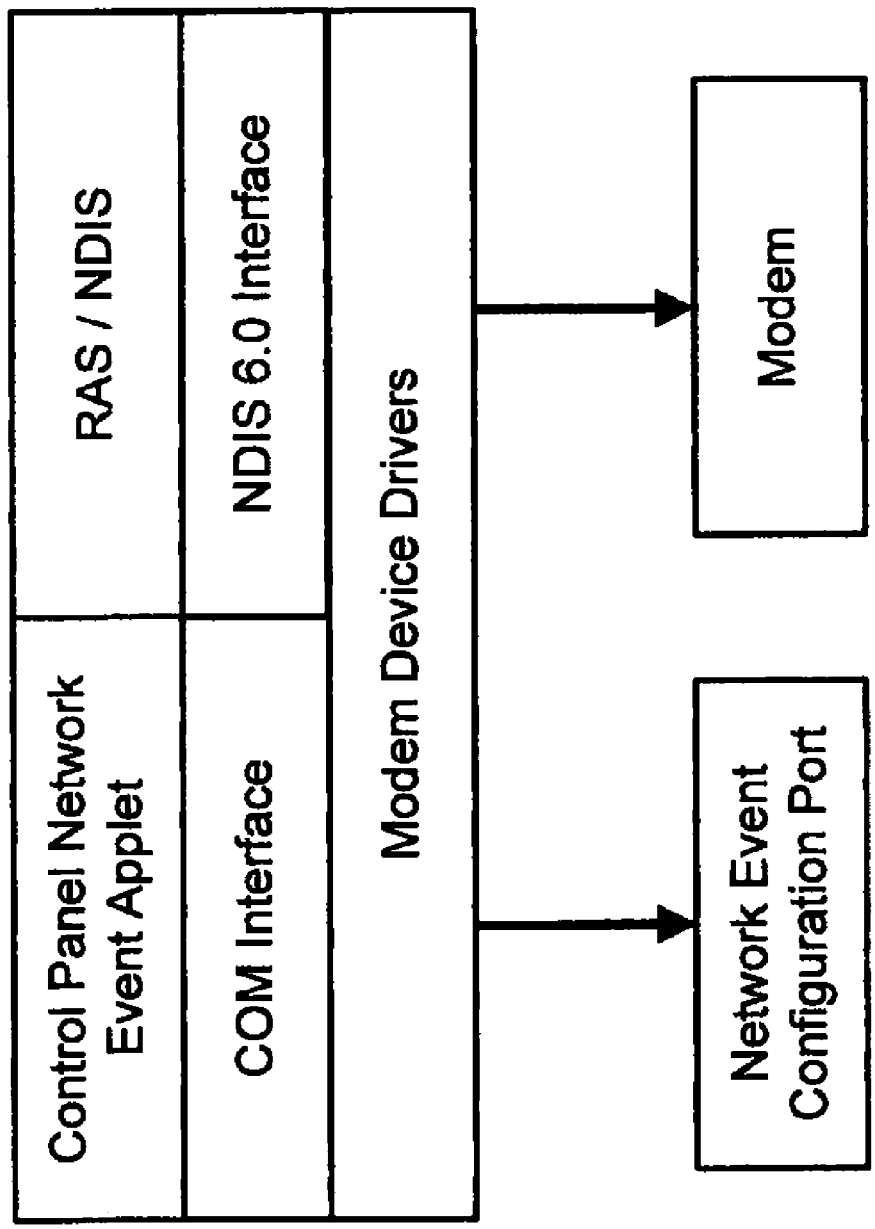
Figure 7:
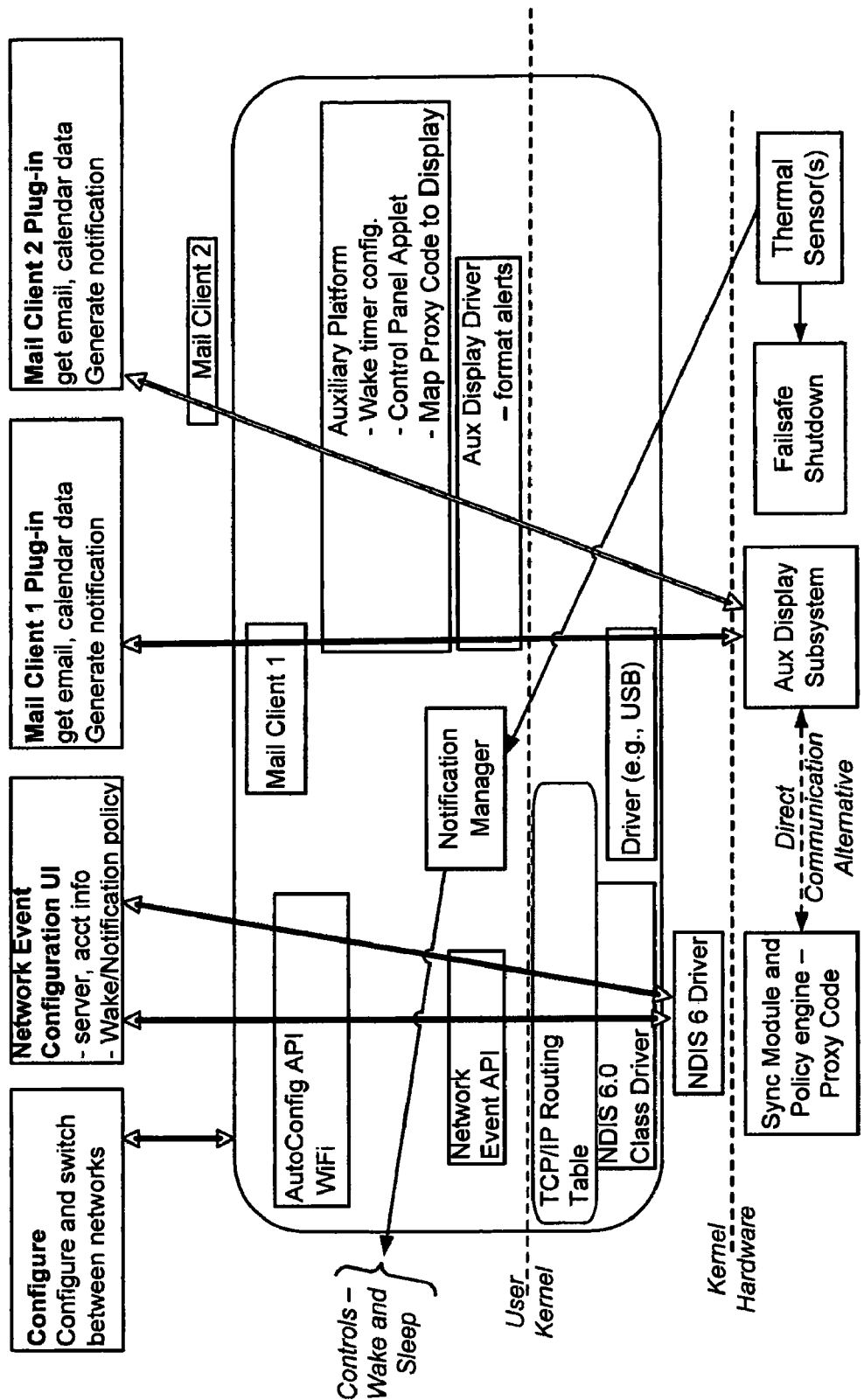
Figure 8:
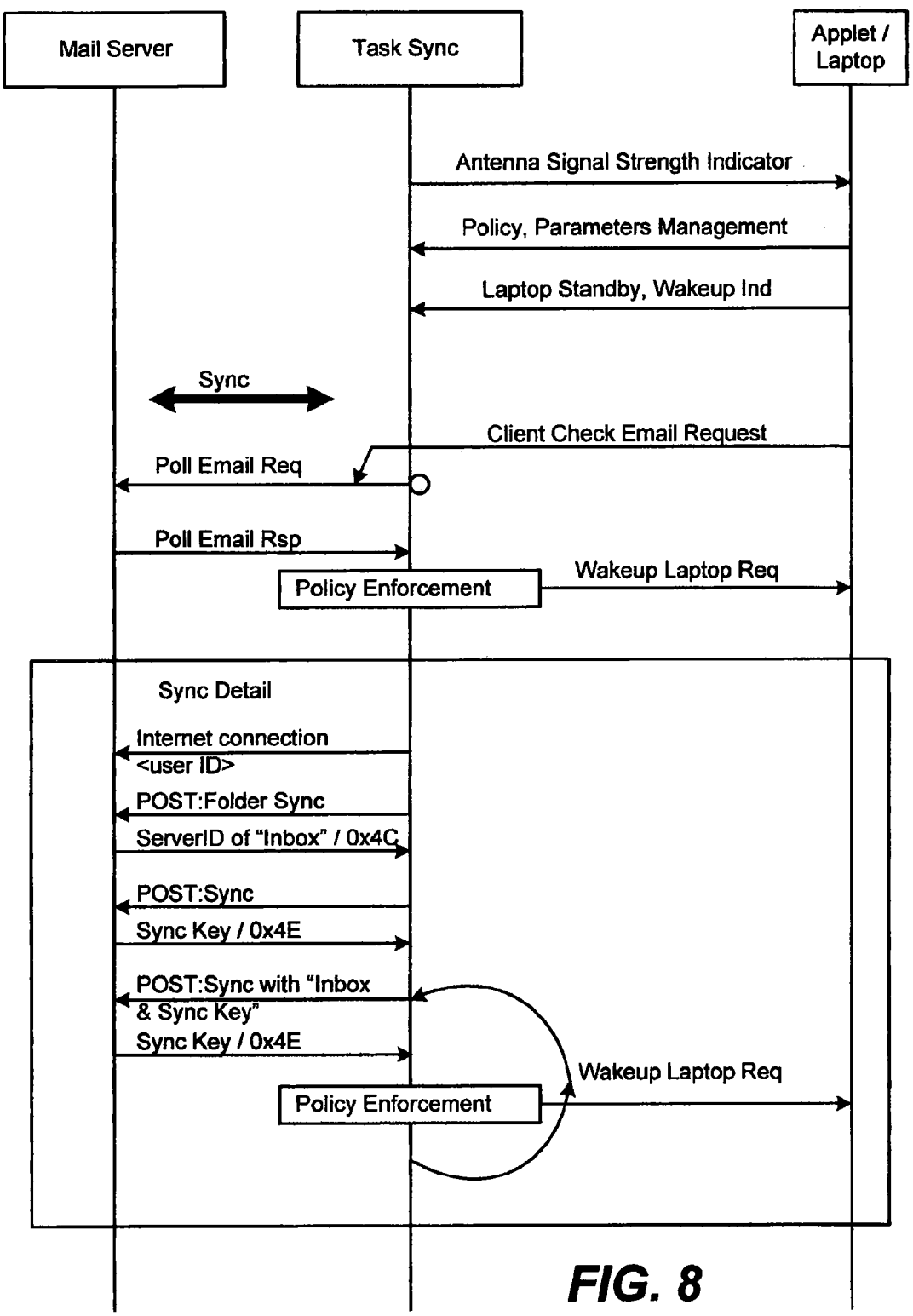

FIGS. 6 and 7 show various components interoperating in one example implementation, while FIG. 8 shows a timing example of a networking subsystem that utilizes the Microsoft ActiveSync® protocol as the proxy for the host email client while the system is in a sleep state. As can be seen in the examples of FIGS. 6-8, the event notification subsystem host software comprises various software components, including a Configuration UI, Host system Driver, a COM API interface, Configuration Software and wizards, and event notification manager.

In general, the components are configured in a setup state, and thereafter interact in various operating states. In the direct push mode, the network subsystem continues to monitor for incoming notifications while system is in a sleep state and either wakes the PC when new notifications are received or sends the notifications directly to the auxiliary display subsystem. In this example implementation of a wake-based push email notification system, the modem connects to the network, communicates with user's mail server, receives notifications of incoming mail or calendar events, and execute rules previously set by the user so as to issue a remote wake event whereby host PC can download emails and write notifications to the auxiliary display. In the poll mode, the system wakes occasionally (e.g., periodically based on a timer) and utilizes the network subsystem to connect to the network downloading email, applying notification policy and then writing to an auxiliary display. Another variant of the poll mode is for the network subsystem to wake periodically and check for email, apply policy and then either wake the system or write directly to the auxiliary display.

Example implementations of the direct push method utilize the Microsoft ActiveSync® protocol (also known as Active Sync), or SMS messaging protocol, implemented on the network subsystem to at as the proxy for the PC while it is in a sleep state. An example implementation of the poll method utilizes a timer on the network subsystem to check for new email after a specified timer interval. When an ActiveSync® notification or SMS message is received, or a timer is expired and triggers communication, the rules policy is executed on the network subsystem. If appropriate, a wake event is triggered and the host subsystem connects to Mail server (e.g., if a network is available in the poll mode). The mail is downloaded to user's default mail client, and the rules policy executed. Any header information is written to the auxiliary display, and another notification may be issued. The main host system then returns to its sleep state. Alternatively, the network subsystem may more directly communicate with the auxiliary display subsystem, e.g., without waking the host system, depending on the wake policy settings.

Figure 9:
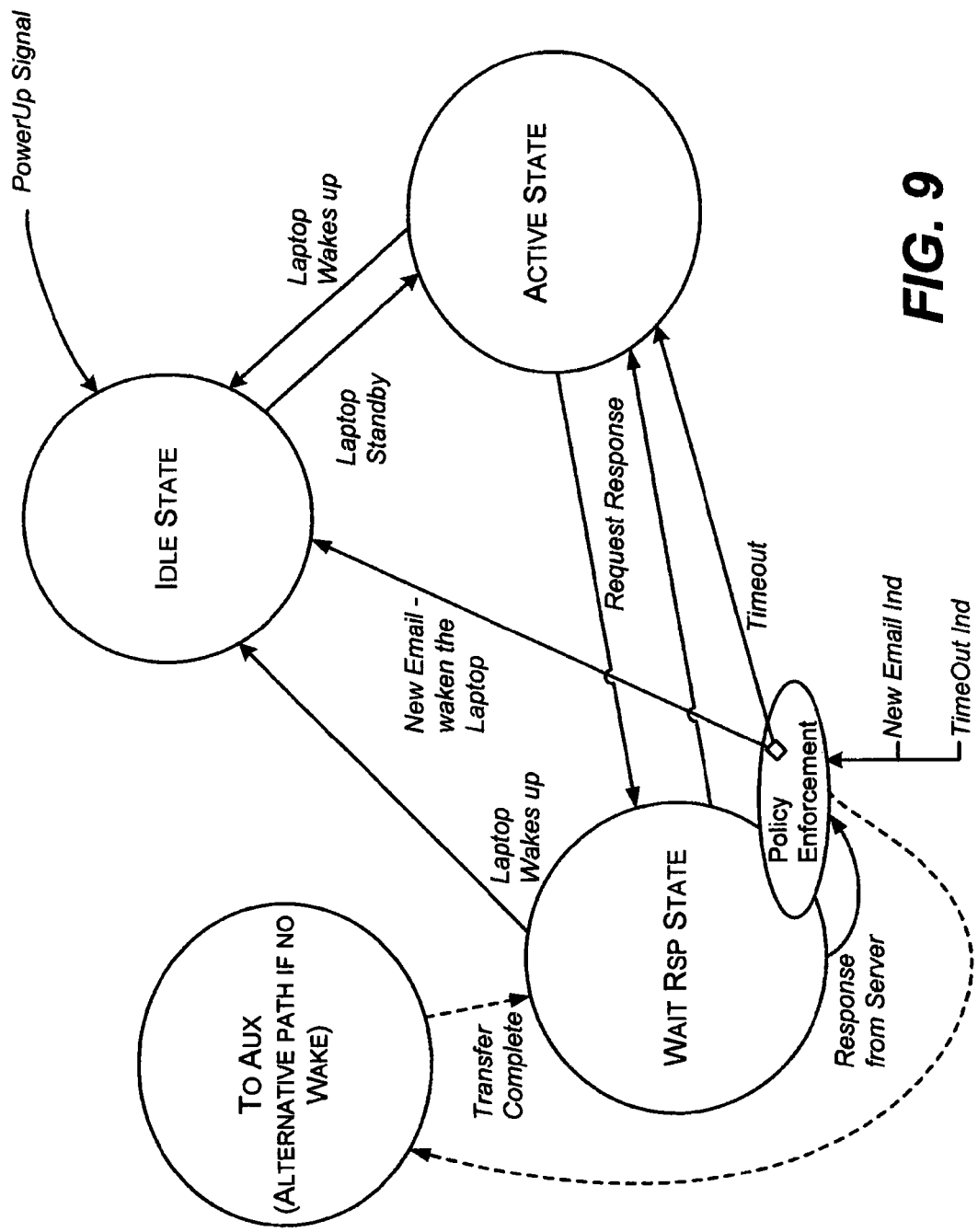
FIG. 9 is a state diagram representing example states and transitions between states for network event handling.

FIG. 9 provides an example state diagram for the embedded proxy client running on the network subsystem, such as for ActiveSync® client functionality, which enables an network subsystem (e.g., a 3G modem) to download email content (e.g., the headers) from an email server when the host system is in standby-like mode, write this information to an auxiliary display subsystem, and/or wake the host system to retrieve email when certain conditions are met. As represented in FIG. 9, the embedded proxy client is at times in an idle mode, such as during an initial power up stage or when the host system is in a running state. A state change from idle to the active state occurs once the host system (e.g., a laptop in FIG. 9) goes into standby-like mode. With correct configurations, the system will still keep the network subsystem powered on when appropriate. In the active state, the proxy client will try to connect with an email (e.g., Microsoft® Exchange) server using the account information temporarily stored in the network subsystem memory. If the connection is successful, the state will change to the wait response state while the proxy client is awaiting a response from the email server. If the request times out, the proxy client will transition back to the active state and a new connection must be made. The synchronization process will occur when a response is received and the proxy client will transition to the Policy enforcement state. In the Policy enforcement state, the proxy client will download any new email headers, then check their sender information, priority, cc/bcc and so forth to decide whether wake up the host according to the policy, also stored in the network subsystem. As described above, additional policies may be checked, such as battery status and email count threshold. Alternatively, the proxy client may decide not to wake the host and write information directly to the auxiliary display subsystem.

An alternative interpretation of FIG. 9 can be made for a proxy client that polls the email server rather than makes a request and then waits for a response. At power up, the synchronization task is initialized and stays in an Idle state. When the laptop enters a sleep state (standby mode), the task turns into an Active State. In the Active State, a timer may be created. The laptop's leaving the standby mode returns the task to an Idle State. In case the communication link is lost, no action is accepted until the communication link is restored. The embedded timer triggers email polling, and turns to a Wait Rsp (response) State.

Upon entering the wait Rsp State, a timer is created; the laptop's leaving of the standby mode returns the task to its Idle State. Again, if the communication link is lost, no action is accepted until the communication link is restored. The embedded timer triggers email polling, and turns to the Wait Rsp (response) State.

The state returns to an Active State, until the next timeout. Upon successful receiving and parsing of a message, the laptop leaves the standby mode. Without successful email parsing, the firmware returns to the Idle State Upon timeout, and the task returns to the Active State.

In the poll mode, the system periodically wakes, checks for new email, and sends notifications to the auxiliary display. In this mode an application runs on the host PC and allows the user to configure when and how often the system should automatically wake up to check for messages. This service uses a system timer for wake and exposes a simple UI (slider) for a user to define wake time interval. When timer expires, system wakes up from S3 sleep state "Standby", connects to any available network (WiFi, 3G, WiMAX . . . ), If a network is available, PC checks for new messages. If new mail is present on the server, mail is downloaded to machine's default email client and a decision is made on whether or not the user should be notified (e.g., Aux Display text, tone, natural language speech, and so forth). This decision is made by a rules engine and according to user's pre-defined criteria. The number of tasks performed during this wake session is controlled by the event notification manager based on system configuration, and the tasks may include opportunistically performing system maintenance, e.g., to update a battery meter, or perform some other scheduled activity. As soon as the last message is downloaded, the system writes notifications to the built-in auxiliary display and goes back to standby and waits for the next wake interval or a manual intervention by the user to wake up. If no messages are found or no network was available, the system simple goes back to sleep and the timer is reset.

Figure 10:
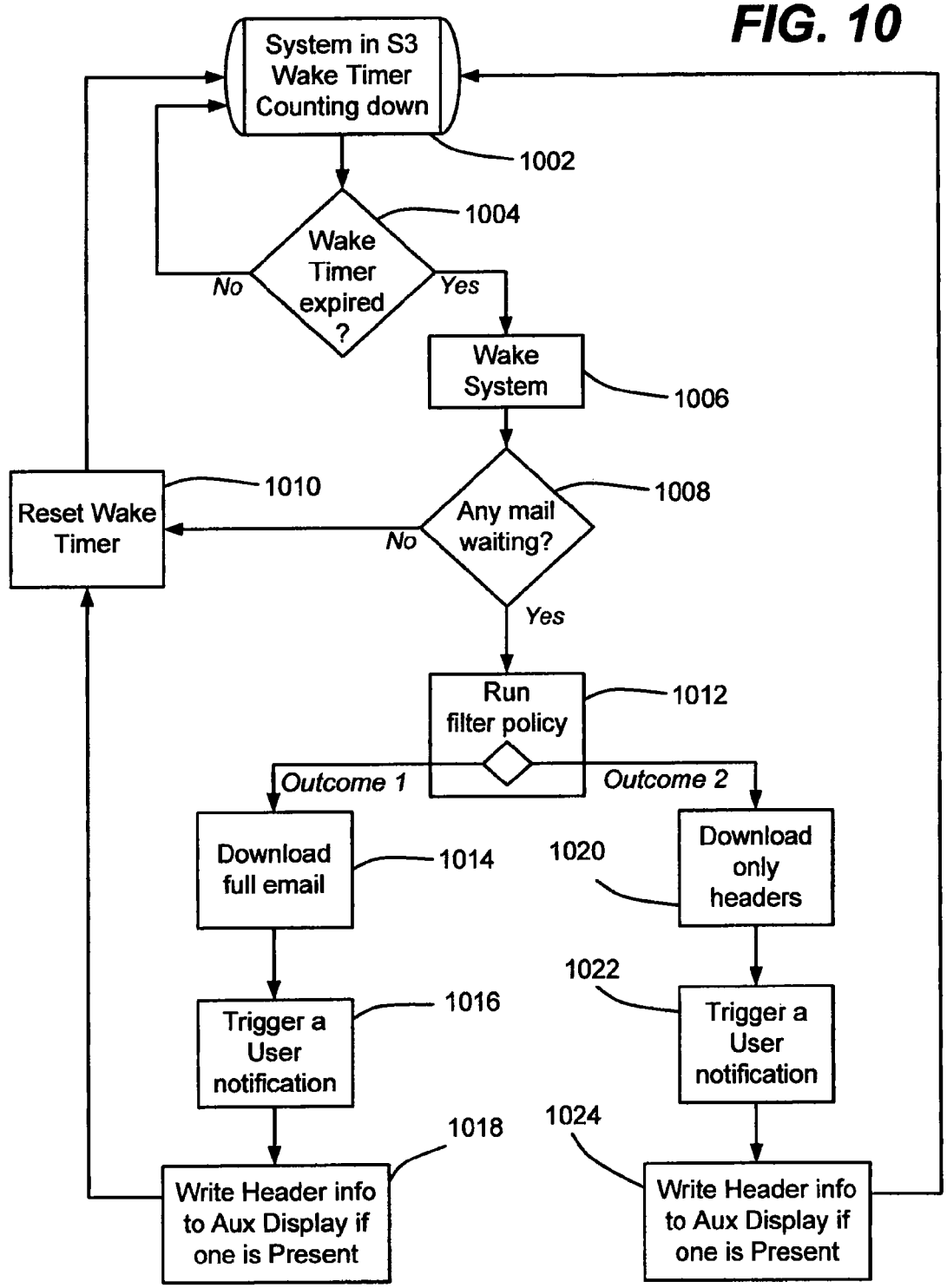
FIG. 10 is a flow diagram representing example steps that may be taken when the host system wakes on a timer and polls a network server for an event and handle the event and related data when available.

FIGS. 10 and 11 are flow diagrams generally representing one way to operate in the poll mode, and push mode, respectively. In general, the logic represented in FIG. 10 allows systems that do not include autonomous network subsystems to simulate the behavior of systems with autonomous network subsystems. In the example of FIG. 10, the system (or part thereof such as the network subsystem) wake on a timer, as represented via steps 1002, 1004 and 1006. If no mail is waiting, the timer is reset and the system returns to its sleep state, as represented via steps 1008 and 1010.

In the situation where mail is waiting, a filter policy is run, as represented by step 1012. Although the filter policy may have many possible outcomes, e.g., ignore or delete junk mail, FIG. 10 represents two possible outcomes, namely one that downloads the full email (step 1014) or one that downloads only the headers (step 1016). A user notification is represented (step 1016 or step 1022), as well as the writing of data, typically the header data, to an available auxiliary display (step 1018 or step 1024).

Figure 11A:
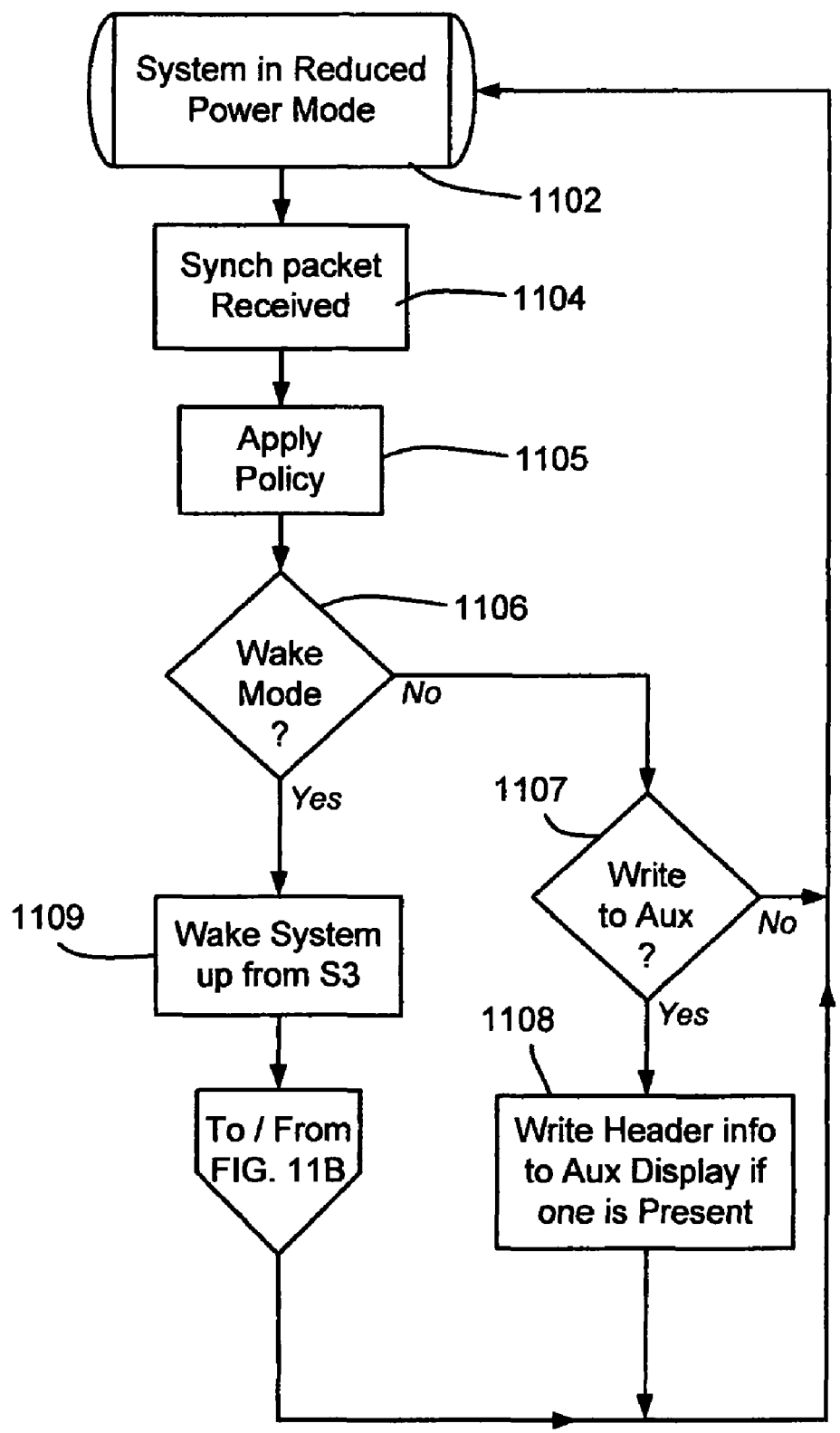
FIGS. 11A and 11B comprise a flow diagram representing example steps that may be taken to handle a network event when a network pushes the event.
Figure 11B:
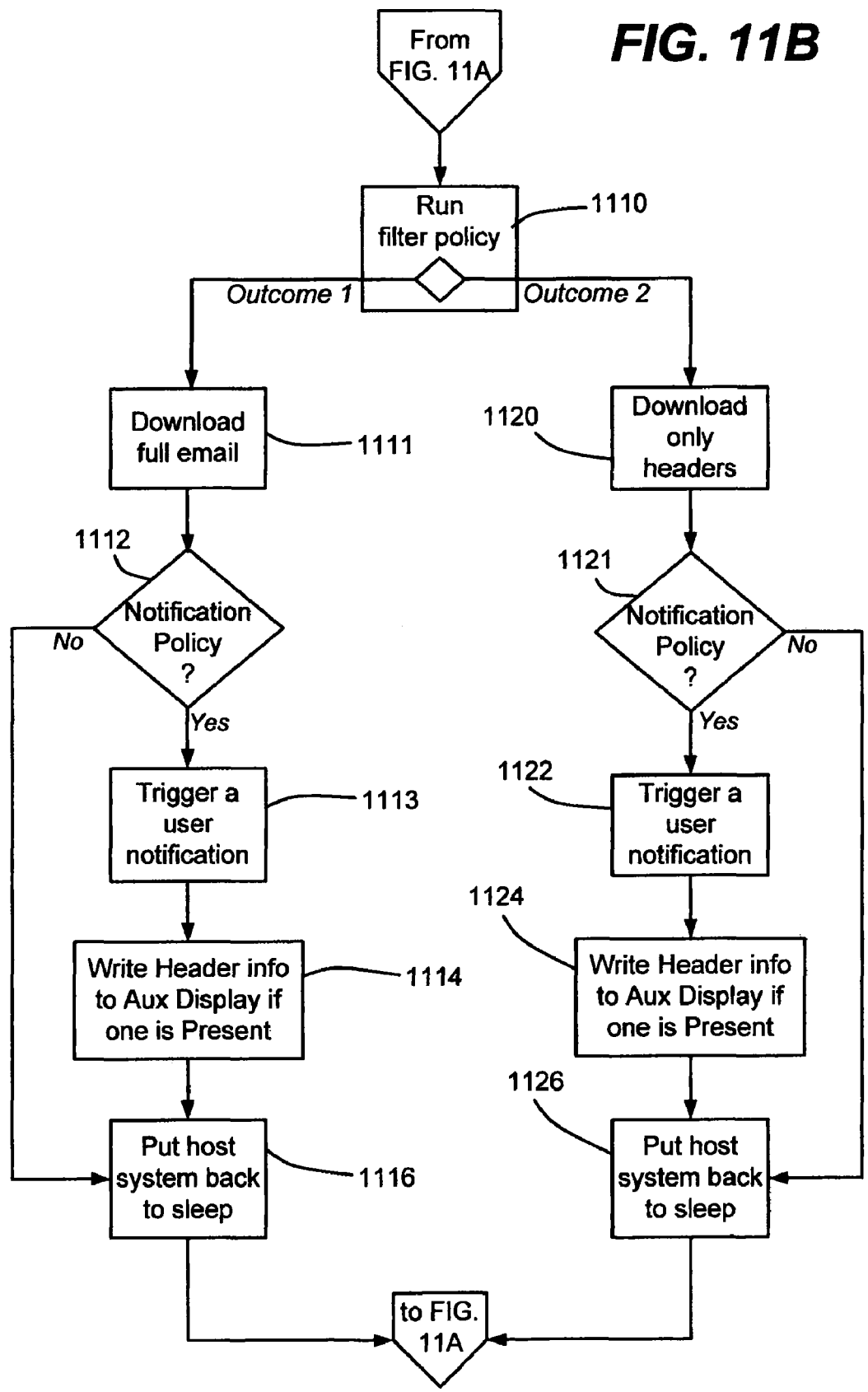

In the push mode example of FIGS. 11A and 11B, the system is awakened on a synchronization packet is received and policy filter indicates that the system should be awakened, if in wake mode (step 1106), as represented via steps 1102, 1104 1105, and 1106 of FIG. 11A. In this example, such a packet means that mail is awaiting download, and that any server policy as to whether to notify the user was met. If the wake mode indicates not to wake the system, the process branches to step 1107 to determine whether to write to the auxiliary display. If so, step 1108 writes the header information to the auxiliary display, if one is present; (whether one is present can be part of the step 1107 evaluation).

If in wake mode at step 1106, the system is awakened at step 1109. Once the system is awakened, a filter policy may be run on the packet, as represented by step 1110 of FIG. 11B. Although the filter policy may have many possible outcomes, e.g., ignore or delete junk mail, FIG. 11B represents two possible outcomes, namely one that downloads the full email (step 1111) or one that downloads only the headers (step 1120). A notification policy may then be run to determine if the user should be notified of one or more of the downloaded emails in steps 1112 and 1121. If the user should be notified, a user notification is represented (step 1113 or step 1122), as well as the writing of data, typically the header data, to an available auxiliary display (step 1114 or step 1124). The system is restored to its sleep state via step 1116 or step 1126, either of which returns to step 1102 of FIG. 11A.

Turning to an explanation of the example target duty cycle mechanism 256 (FIG. 2B), in general, if present, such a mechanism 256 allows an event notification subsystem-equipped system 210 to set wake policy to balance between immediacy of email and calendar notifications, battery life and the system's thermal state. The mechanism 256 takes input values that are set by device manufacturers or the like and entered into non-volatile system memory, such as the registry. These input values may include a target duty cycle (TDC) (e.g., a percentage or fractional value that indicates the target ratio of the time in the wake state (S0) to time between the most recent wake event and the previous wake event), the maximum wake time (S0max), (e.g., a value that determines the maximum time the system is allowed to stay in the S0 state once it is woken up for notifications; if tasks are not completed within Max S0 time, event notification subsystem manager will force the system to a sleep state such as S3 regardless of any notification's state), and minimum sleep time (S3 min), (e.g., a value that determines the minimum amount of the time the system must stay in a sleep state once entered before waking again). The event notification manager keeps track of the system's S3 and S0 times, and throttles the waking of the system for notifications as needed to maintain the target duty cycle over an average of two or more wake sleep cycles. In addition, device manufacturers can provide custom applications that can temporarily modify the duty cycle in response to extreme unfavorable events such as thermal conditions.

The following examples are based on likely typical usage estimates, such as types of users' power usage in a given ten hour (e.g., work) day, e.g., light users who typically receive around twenty to twenty-five notifications per day in the ten hours, medium users who typically receive up to fifty to sixty notifications per day and heavy users whom typically receive one-hundred or more notifications per ten-hour day. Note that in a typical day, users will have their system plugged into an external power source for some portions of the day, however these estimates do not take this into account, resulting in providing more conservative power consumption numbers. The model also assumes a separate wake for each notification, however, in a typical day some emails are likely delivered in a batch, (even if not explicitly configured for batch receipt), making the estimates even more conservative.

Further, in this example, estimates are based on a power average (Pang) of 0.865 watts for an event notification subsystem system with Direct Push enabled while in S3-like sleep state, e.g., normal S3 plus USB wake plus WWAN wake, but not sending/receiving. In this example, the power average of an event notification subsystem system using the poll mode while in S3 is 0.5 watts, while the power average of an enabled system while in S0 is 6.0 watts, assuming the lid is closed and the main display is off. Other estimates for this example include a wake (S0) time for each notification of 120 seconds. With such a wake time, the average time between notifications Tavg based on ten hours per day for a light user is 1500 seconds (25 minutes), for a medium user is 600 seconds (10 minutes), and for a heavy user is 360 seconds (6 minutes). An estimate for the size of the battery in an event notification subsystem system comprises 6 cells of 8.4 watt-hours/cell for a total of 50.4 watt-hours.

Figure 12:
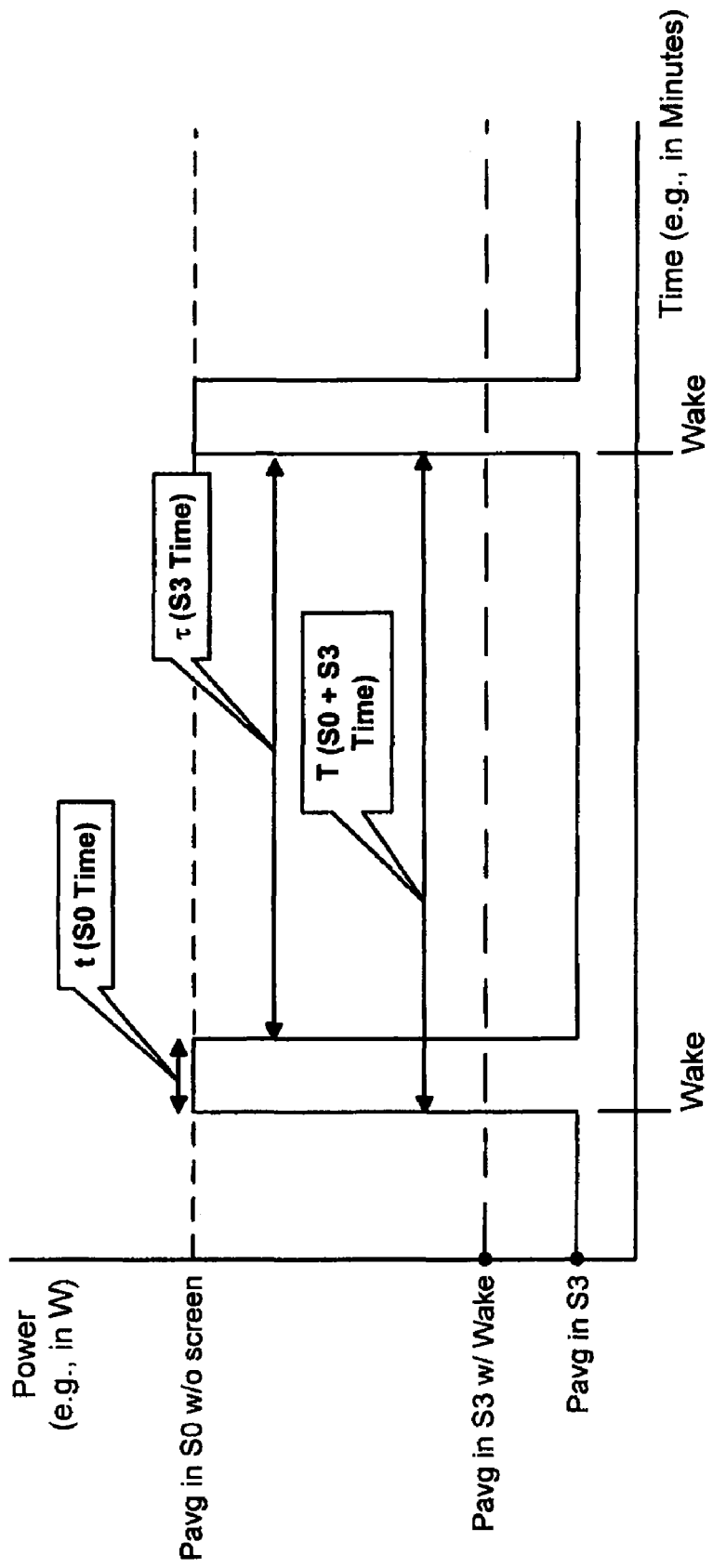
FIG. 12 is a timing diagram representing timing of a target duty cycle mechanism.

FIG. 12 is an example duty cycle-related timing diagram. In general, and in FIG. 12, the following information may be used:

S3: A mostly standardized power state, it is also often referred to a standby mode. A system in this mode is in a very low power state, e.g., essentially keeping power to main system memory and I/O subsystems to allow remote wake with everything else shut off.

S0: A system in this mode is in full functioning mode; CPU is in running state but other components may be turned off such as the main display.

Duty Cycle is the ratio of S0 time to "S0+S3" time. DC=t/T or DC=t/t+τ

Target Duty Cycle is a value (e.g., a percentage or ratio), typically set by a device manufacturer or the like for a given system containing an event notification subsystem that wakes the system to handle events. For example, this value may be a result of investigation by device manufacturers of thermal states and battery life for a given type of device.

Running Duty Cycle=(tn+tn−1+ . . . +tn−N)/(Tn+Tn−1+ . . . +Tn−N)

Min S3 time=the minimum time the system must spend in S3 before a non-user initiated wake event occurs Next min S3 time=((current duty/target duty)*Average Segment length)−Last Wake Time T=a segment of time tracking the duration between system resume t=is the time a system spends in S0 power state τ=the time system spends in S3 power state τ=T−t When the event notification subsystem manager 259 starts, it starts tracking running duty cycle. After some number of (e.g., three or N=2) cycles, the event notification subsystem manager 259 calculates the delta between the running duty cycle and the target duty cycle. If the running duty cycle is bigger than target duty cycle, the event notification subsystem manager calculates a next min S3 time that is larger than the default and passes it to the network subsystem using a SyncSetDeviceWakeInterval call using the example API defined below. This ensures that the system stays asleep long enough to begin to bring the duty cycle back in line with the target duty cycle. Once the new min S3 time value is passed to the network subsystem the system returns to sleep. On the next wake, a new running duty cycle is calculated, and the oldest data point from the previous calculation is dropped (providing a rolling table effect) a new min S3 time is calculated, passed to the network subsystem, the system returns to sleep, and this process continues until the running duty cycle is less than or equal to the target duty cycle. Once the running duty cycle is smaller than or equal to the target duty cycle, the event notification subsystem manager passes a "default Min S3 time" value to the network subsystem using a SyncSetDeviceWakeInterval call. Typically, the default min S3 time will be set based on timing limitations of the system to resume from S3 after entering S3. The algorithm always starts over when the user initiates a system wake by opening the lid or pressing the power button.

The Min Wake Time may be calculated as follows:

$$\text{Next Min Wake Time} = \tau_{Cur} + (t_{Cur} r - t_{Avg})/T_{Avg} * \tau_{Cur}$$

The duty cycle mechanism takes into consideration a number of different wake events, including poll mode, network status, battery status, blackout period, and direct push notifications wake events. Poll mode wake may be the default mode for an event notification subsystem not equipped with event notification subsystem-capable network subsystems. In this mode, the user may configure the computer system to wake up periodically and check for network availability. If a network is available, the user's default mail client is run (if it is not already running), any new mail and calendar requests are downloaded, and appropriate notifications are written to an auxiliary display, if present. If no network is available, upcoming calendar notification(s) are written to the auxiliary display. The poll mode timer is reset and the system goes back into standby mode; note that the poll mode timer is reset when the system is in S0 sleep state. The event notification manager or other component that sets polling wake timers should be aware of the min S3 time and should set the timer at a value equal to or greater than the min S3 time.

Two types of network status notifications that may wake the system include network gone and network available notifications. Network Gone Wake Notification refers to the network subsystem monitoring (e.g., constantly) for network availability. If a network becomes unavailable, the network subsystem retries the network some number of times (e.g., three) according to a "Network Retry" interval. If a network is still unavailable after N retries, the network subsystem sets the appropriate SynchSetWakeFlag bit in the example API described below and issues a wake event. When the system is in S0, a "Network Not Available" icon is written to the auxiliary display, and system returns to standby mode.

Network available wake notification is based upon a network subsystem monitoring (e.g. constantly) for network availability. If a network becomes available after a period of unavailability, the network subsystem retries an additional number (e.g., two) times more; if a network is still available, the network subsystem sets the appropriate SynchSetWakeFlag bit and issues a wake event. When the system is in S0, a "Network Available" icon is written to the auxiliary display, and the system goes back to standby mode.

Network status wake events are an optional feature of event notification subsystem, e.g., a wake may no longer be required for network status notifications if network status notifications are passed directly to the system's auxiliary display using other interfaces. Network status wake events affect target duty cycle behavior, but the target duty cycle does not affect network status wakes.

In general, whenever a system is in S0, a "SynchSetNextWakeInterval" value is recalculated and passed to a Network subsystem. For battery status wake events, the battery agent wakes the host system if it is in standby mode and reads a new battery status. If the battery level has either increased or decreased by a certain percentage, e.g., twenty-five, fifty or seventy-five percent, the auxiliary display is updated with an appropriate battery icon. During this wake event, as soon as the auxiliary display is updated, the system returns to standby mode. Battery Status Wake notifications affect target duty cycle, but not vice-versa.

"Blackout period wake events" comprises a setting that in one implementation is not enabled or configured by default, but rather requires advanced interaction to enable, and possibly define. A blackout period defines a time period during which event notification subsystem feature is not needed. During a blackout period, the event notification subsystem is disabled, e.g., from 9:00 PM to 6:00 AM if another period is not chosen. The blackout time may be passed to the network subsystem as global time, to help with travel situations. If mail and/or calendar notifications have been queued up during a blackout period, the network subsystem will trigger a wake notification at the end of a blackout period; queued up notifications may be delivered to Auxiliary display in a single batch. If enabled, the blackout period enhances the system battery life and avoids notifying the user at inopportune times. Blackout or an equivalent setting may be used to turn off the system and/or radio in other environments, e.g., so the computer can be prevented from communicating yet still be used in other ways during an airplane flight.

A primary example of Direct Push wake events are wake events triggered by mail or calendar notifications. The frequency of Direct Push wake events directly affect the target duty cycle wake interval. When notifications are too frequent, the running duty cycle may become greater than the specified target duty cycle. When this happens, the target duty cycle mechanism may increase the min S3 time to give the system a chance to get back to back to its stated target duty cycle.

In general, the target duty cycle mechanism enforces a min S3 time for non-user triggered wake events. Based on all possible wake events, battery life remaining and the target duty cycle value, a next min S3 time is calculated and passed to the modem/WWAN card. Third party applications may be given programmatic access to set a temporary target duty cycle and pass the value to network subsystem using a SynchSetNextWakeInterval API call. For example, thermal management applications may set an appropriate temporary target duty cycle in response to unfavorable thermal and/or battery conditions. There is also a Max S0 time after which event notification subsystem manager forces the system into S3, regardless of task status.

Thus, in addition to the target duty cycle value, device manufacturers can have their own application program or programs set a temporary target duty cycle value in response to undesired thermal conditions or other (e.g. power) states. In one implementation, when such an application sets a temporary target duty cycle, that value becomes the new target duty cycle until the application clears the value, e.g., in the registry. The same application program is responsible for clearing temporary target duty cycle. If not cleared after the system's thermal conditions have dropped back to normal, the temporary target duty cycle will continue to be used; this may result in event notification delays.

In other implementations, other mechanisms are feasible, e.g., a temporary target duty cycle supersedes a target duty cycle, but the temporary target duty cycle will expire unless renewed. This will prevent an application from restoring the correct value when it should be restored due to application failure or a bug.

The following example API set includes functionalities of client control, status query, policy control, account settings and SSL certificates programming. In this example, a COM server running in the background communicates with 3G modem status port and provides COM interface to an applet. Note that an embedded synchronization client uses mode connection to communicate with a remote server during the standby mode, however RAS and NDIS regain the control of the 3G modem once the system wakes up.

System wake-up events are typically handled by a program by which an application can restore an On-Now capable computer that is in a sleeping state to the working state by using a scheduled time or a device event, that is, a wake-up event. A wait-able timer object is used to specify the time at which the system should wake, e.g., using a CreateWaitableTimer function in the Microsoft® Windows® API set. To set the timer, the SetWaitableTimer function is used; the pDueTime parameter specifies when the timer will be signaled. To specify that the system should wake when the timer is signaled, the fResume parameter is set to TRUE.

When the system wakes automatically because of an event (other than power switch or user activity), the system automatically sets its idle timer to some amount, such as one minute. This timer allows applications to call a function, such as the SetThreadExecutionState function in the Microsoft® Windows® API set to indicate that they are busy, which enables the system to go to standby without affecting the user.

Criteria may be used determine whether a system standby is needed, e.g., if the system wakes automatically, it returns to standby as soon as the last task is completed, as indicated by the process calling SetThreadExecutionState. If the system wakes automatically, but the user provides new input while the event is handled, the system does not return to standby automatically when the last task finishes. If the system is on and the user is active, the system does not enter the sleeping state unless initiated by the user. If the system is on, no applications are busy, and the user is inactive for a period of time, the system enters the sleeping state when the idle timer expires.

In a Microsoft® Windows®-based system, when the system wakes automatically, the system broadcasts the PBT_APMRESUMEAUTOMATIC event to applications. Because the user is not present, most applications should do nothing. Event-handling applications, such as fax servers, should handle their events. To determine whether the system is in this state, the IsSystemResumeAutomatic function may be called.

If the system wakes due to user activity after broadcasting PBT_APMRESUMEAUTOMATIC, the system broadcasts the PBT_APMRESUMESUSPEND event and turns on the display. Applications reopen files that were closed when the system entered the sleeping state, and should prepare for user input. If an application called SetSystemPowerState with fForce set to TRUE, no applications will receive the PBT_APMQUERYSUSPEND event when the system enters the sleeping state. If the system is carrying out a critical suspension, no applications receive a PBT_APMQUERYSUSPEND or PBT_APMSUSPEND event; they instead receive a PBT_APMRESUMECRITICAL event.

The following exemplifies an API that may be used for setting a wake timer. The application gets notified when the system wakes. The SetWaitableTimer function activates the specified waitable timer; when the due time arrives, the timer is signaled and the thread that set the timer calls the optional completion routine.

```
BOOL SetWaitableTimer(
    HANDLE hTimer,
    const LARGE_INTEGER* pDueTime,
    LONG lPeriod,
    PTIMERAPCROUTINE pfnCompletionRoutine,
    LPVOID lpArgToCompletionRoutine,
    BOOL fResume
);
```

In an exemplary wireless implementation of the push event notification model, a user's mail server receives email on behalf of the user; a special message (synchronization packet) is formulated and sent to user's mobile personal computer over a 3G (third generation) cellular network or other wireless networks. This message is received by mobile personal computer's integrated wireless module (WiFi, WiMax, 3G and so forth). If the system happened to be on and connected to the wireless network, email is delivered in a normal fashion to user's local mail client cache. If the system happens to be in a sleep state such as corresponding to standby or possibly hibernate, a synchronization packet is received by mobile 3G module, which generates a system wake up event and instructs client mail application to synch with mail server. Once mail has been delivered to client has been completed, header information e.g., "From," "Subject," and two lines of message body fields.

| EXAMPLE COM OBJECT API | |
|---|---|
| SyncSetMode | |
| long SyncSetMode(long nMode); | |
| Applications call SyncSetMode to enable or disable the ActiveSync ® client feature. | |
| Parameters | |
| nMode | This is the index of the ActiveSync ® client mode.<br>0: To disable<br>1: To enable |
| Returns | |
| long | If no error occurs, this function call returns zero. Otherwise, it returns a specific error code can be found in ActiveSync ® COM API Error CodeTable. |
| SyncSetUserAccount | |

| EXAMPLE COM OBJECT API |  |
|---|---|
| long SyncSetUserAccount(BSTR lpszUsername, BSTR lpszPassword, BSTR lpszServername); Applications call SyncSetUsername to set username of the email account. Parameters | |
| lpszUsername | This is the pointer of the username string buffer. Maximum string length is 128 bytes. |
| lpszPassword | This is the pointer of the password string buffer. Maximum string length is 128 bytes. |
| lpszServername | This is the pointer of the server name string buffer. Maximum string length is 128 bytes. |
| Returns | |
| long | If no error occurs, this function call returns zero. Otherwise, it returns a specific error code can be found in ActiveSync ® COM API Error Code Table. |
| SyncWriteCertificate long SyncWriteCertificate(BSTR lpszFilename); Applications call SyncWriteCertificate to program SSL client certificate for ActiveSync ® client to use. Parameters | |
| lpszFilename | This is the pointer of the buffer of certificate file path. Maximum string length is 256 bytes. |
| Returns | |
| long | If no error occurs, this function call returns zero. Otherwise, it returns a specific error code can be found in ActiveSync ® COM API Error Code Table. |
| SyncClearCertificate long SyncClearCertificate(BSTR lpszFilename); Applications call SyncClearCertificate to delete an existing SSL client certificate in WWAN modem. Parameters | |
| lpszFilename | This is the pointer of certificate filename string buffer. Maximum string length is 256 bytes. Filename only, no path is required. |
| Returns | |
| long | If no error occurs, this function call returns zero. Otherwise, it returns a specific error code can be found in ActiveSync ® COM API Error Code Table. |
| SyncSetRuleMode long SyncSetRuleMode (long nFilterMode); Applications call SyncSetRuleMode to enable or disable the filtering rules. Parameters | |
| nFilterMode | This is the index of filtering mode. 0: To disable filtering. The system will wake up on every server filtered notification. 1: To enable filtering. |
| Returns | |
| long | If no error occurs, this function call returns zero. Otherwise, it returns a specific error code can be found in ActiveSync ® COM API Error Code Table. |
| SyncSetFilterOwner long SyncSetFilterOwner (BSTR lpszOwner); Applications call SyncSetFilterOwner to set email address of the owner. WWAN modem will notify the user of emails if owner is the only one on the to line. Parameters | |
| lpszOwner | This is the pointer of owner email address string buffer. Maximum string length is 128 bytes. |
| Returns | |
| long | If no error occurs, this function call returns zero. Otherwise, it returns a specific error |

| EXAMPLE COM OBJECT API |  |
|---|---|
| | code can be found in ActiveSync ® COM API Error Code Table. |
| SyncSetFilterPriority long SyncSetFilterPriority (long nPriority); Applications call SyncSetFilterPriority to set priority level. User will be notified if there is incoming email with high priority. Parameters | |
| nPriority | This is the on/off switch of priority filtering. 0: To disable. 1: To enable. The system will wake up on emails with high priority. |
| Returns | |
| long | If no error occurs, this function call returns zero. Otherwise, it returns a specific error code can be found in ActiveSync ® COM API Error Code Table. |
| SyncSetFilterSenders long SyncSetFilterSenders (BSTR lpszSenders); Applications call SyncSetFilterSenders to set email addresses whose emails will wake up the system. Parameters | |
| lpszSenders | This is the pointer of the sender email addresses string buffer. Maximum string length is 512 bytes. |
| Returns | |
| long | If no error occurs, this function call returns zero. Otherwise, it returns a specific error code can be found in ActiveSync ® COM API Error Code Table. |
| SyncSetDeviceWakeInterval long SyncSetDeviceWakeInterval (long nSecond); Applications call SyncSetDeviceWakeInterval to set number of seconds to wait before next waking up. This setting will allow WWAN modem to hold a notification for certain time without waking up host too often. Parameters | |
| nSecond | This is the number of seconds. |
| Returns | |
| long | If no error occurs, this function call returns zero. Otherwise, it returns a specific error code can be found in ActiveSync ® COM API Error Code Table. |
| SyncSetBlackoutPeriod long SyncSetBlackoutPeriod (long nStarthour, long nStartMinute, long nEndHour, long nEndMinute); Applications call SyncSetBlackoutPeriod to set a blackout period. This setting will allow WWAN modem to hold a notification during this period without waking up host. Parameters | |
| nStartHour | This is the starting hour of blackout period. Range [0..23]. |
| nStartMinute | This is the starting minute of blackout period. Range [0..59]. |
| nEndHour | This is the ending hour of blackout period. Range [0..23]. |
| nEndMinute | This is the ending minute of blackout period. Range [0..59]. |
| Returns | |
| long | If no error occurs, this function call returns zero. Otherwise, it returns a specific error code can be found in ActiveSync ® COM API Error Code Table. |
| SyncCheckWakeFlag long SyncCheckWakeFlag (long &nWakeFlag); Applications call SyncCheckWakeFlag to determine if WWAN modem woke up host system. This parameter is a 32 bit field. Each bit is defined for a specific wake event. Parameters | |

| EXAMPLE COM OBJECT API | |
|---|---|
| nWakeFlag | If any bit is set to 1, the WWAN modem woke the host system up<br>Bit 0: Reserved for Email notifications<br>Bit 1: Reserved for calendar notification.<br>Bit 2: Reserved for Network status notification<br>Bit 3: Reserved for Error Notifications<br>Bit 4-31: Reserved future services<br>Bit 31: if set, the function call failed. Use ActiveSync ® COM API Error Code Table( ) to get detailed error code. |
| Returns | |
| long | If no error occurs, this function call returns zero. Otherwise, it returns a specific error code can be found in ActiveSync ® COM API Error Code Table. |
| SyncClearWakeFlag<br>long SyncClearWakeFlag (void);<br>Applications call SyncClearWakeFlag to clear the wake up indicator flag stored in WWAN modem.<br>Parameters<br>Returns | |
| long | If no error occurs, this function call returns zero. Otherwise, it returns a specific error code can be found in ActiveSync ® COM API Error Code Table. |
| SyncQueryStatus<br>long SyncQueryStatus (VARIANT* varStatus);<br>Applications call SyncQueryStatus to query detailed ActiveSync ® client status.<br>Parameters | |
| varStatus | This is the reference of client status structure. Structure format is to be defined. |
| Returns | |
| long | If no error occurs, this function call returns zero. Otherwise, it returns a specific error code can be found in ActiveSync ® COM API Error Code Table. |
| SyncClientControl<br>long SyncClientControl (VARIANT* varAction);<br>Applications call SyncClientControl to send control command to the ActiveSync ® client.<br>Parameters | |
| varAction | This is the reference of control command structure. Structure format is to be defined. |
| Returns | |
| long | If no error occurs, this function call returns zero. Otherwise, it returns a specific error code can be found in ActiveSync ® COM API Error Code Table. |

| EXAMPLE ACTIVESYNC ® COM API ERROR CODE TABLE | | |
|---|---|---|
| Error Code | Value | Description |
| LR_ERROR_UNKNOWN | 1 | Unknown internal Error. |
| LR_ERROR_BAD_CMD | 2 | WWAN device received incorrect command. |
| LR_ERROR_BAD_PARAM | 3 | Incorrect parameters. |
| LR_ERROR_BAD_LEN | 4 | Incorrect length. |
| LR_ERROR_BAD_SEC_MODE | 5 | WWAN device rejects command for security reasons. |
| LR_ERROR_PORT_NOT_OPEN | 6 | WWAN device communication port has not been opened. |
| LR_ERROR_TIMED_OUT | 7 | WWAN device did not respond on time. |
| LR_ERROR_INVALID_PARAM | 8 | Invalid parameters. |
| LR_ERROR_WRITE_FAILED | 9 | Unable to issue command to WWAN device. |
| LR_ERROR_EXCEPTION_CAUGHT | 10 | Exception caught. |
| LR_ERROR_DATA_CORRUPT | 11 | Response from WWAN device is in incorrect format. |
| LR_ERROR_MODE_CHANGE_FAILED | 12 | Unable to change WWAN device mode. |
| LR_ERROR_BUFFER_TOO_SMALL | 13 | Buffer is too small. |
| LR_ERROR_PORT_OPEN_FAILED | 15 | Unable to open WWAN device communication port. |
| LR_ERROR_LOADER_NOT_INITIALIZED | 16 | API is not properly initialized. |
| LR_ERROR_PORT_ALREADY_OPEN | 17 | WWAN device communication port has already been opened. |
| LR_ERROR_PORT_SETTINGS_FAILED | 18 | WWAN device communication port has incorrect settings. |
| LR_ERROR_INTERNAL_ERROR | 19 | Internal error. |
| LR_ERROR_API_NOT_SUPPORTED | 20 | API is not supported by WWAN device. |
| LR_ERROR_BAD_SPC_MODE | 21 | WWAN device requires security code. |
| LR_ERROR_FILE_OPEN_FAILED | 25 | File cannot be opened. |
| LR_ERROR_NV_ERROR | 26 | Internal none volatile memory access error. |
| LR_ERROR_DEVICE_NOT_AVAILABLE | 27 | WWAN device is not present. |
| LR_ERROR_FS_ERROR | 28 | Internal file access error. |
| LR_ERROR_ACTIVATION_FAILED | 29 | WWAN device is not activated promptly. |
| LR_ERROR_DEVICE_ALREADY_LOCKED | 49 | WWAN device has already been |

EXAMPLE ACTIVESYNC ® COM API ERROR CODE TABLE

| Error Code | Value | Description |
| --- | --- | --- |
| | | locked. |
| LR_ERROR_DEVICE_ALREADY_UNLOCKED | 50 | WWAN device has already been unlocked. |
| LR_ERROR_INVALID_LOCK_CODE | 51 | Incorrect lock code. |
| LR_ERROR_INVALID_ACTIVATION_CODE | 52 | Incorrect activation code. |
| LR_ERROR_OPERATION_NOT_ALLOWED | 53 | Operation is not allowed. |

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system comprising:
   a main host system; and
   a network event notification subsystem associated with the main host system, including a networking subsystem to act as a proxy for the computer system when the main host system is in a sleep state, wherein the networking subsystem is configured to perform the following:
   receive an external content or event notification;
   determine, according to a user-defined policy that indicates the relative importance of each of a plurality of different content and events, that the content or event is important enough to wake one or more selected individual components of the main host system to respond to the content or event notification;
   determine, according to a hardware wake policy that indicates a current battery level and current thermal level, that a minimum battery level threshold is currently met by the battery and that a maximal thermal level threshold is not being exceeded by the host system;
   based on the battery level and thermal level determinations and based on the indication of importance in the user-defined policy, determine the extent to which the main host system is to be awoken in order to process the content or event notification, wherein only the selected individual components of the main host system necessary to process the content or event notification are to be awoken, the system being configured to selectively wake any one or more of a plurality of different individual host system components;
   based on the determination, wake only the determined individual components of the main host system to respond to the content or event notification, such that those components of the main host system that are not needed to process the content or event notification are not awoken; and
   upon determining that the content or event notification has been processed, return the awoken components of the main host system to its sleep state.

2. The system of claim 1, wherein the determined individual components of the main host system are awoken to respond to the content or event notification based on both the battery level and thermal level determinations as well as the indication of importance in the user-defined policy.

3. The system of claim 1, wherein the networking subsystem awaits an external synchronization packet.

4. The system of claim 1, wherein the networking subsystem wakes at least part of the main host system based on the external content or event notification.

5. The system of claim 1, wherein the networking subsystem writes to a low power auxiliary display subsystem without waking the main host system based on the external content or event notification.

6. The system of claim 5, wherein the networking subsystem selectively wakes the main host system according to a duty cycle that is computed based on at least one criterion of a set, the set including immediacy of email and calendar notifications, battery life, and a thermal state of the host system.

7. The system of claim 1, further comprising a policy mechanism that evaluates one or more criterion to determine whether to notify the user of an event based on the external content or event notification.

8. The system of claim 1, further comprising a notification mechanism that provides a user-perceptible notification based on the external content or event notification.

9. The system of claim 1, wherein the proxy corresponds to an email client program that receives information from a server corresponding to available email content and/or calendar events.

10. The system of claim 1, wherein the proxy corresponds to an Instant messaging client program that receives information from a network server corresponding to available instant messaging content and/or events.

11. The system of claim 1, wherein the proxy corresponds to a Voice over Internet Protocol (VoIP) client program that receives information from a network server corresponding to available voice call or voice mail content and/or events.

12. The system of claim 1, wherein the proxy corresponds to a web site change notification client program that receives information from a network server corresponding to new web server content.

13. The system of claim 1, further comprising notification management components and associated measurement components for controlling power consumption and temperature to avoid stressing the system, draining a battery, and/or control energy usage.

14. The system of claim 13, wherein the notification management components and associated measurement components utilize statistics and control limits for values, including at least one of, a time in normal power mode, a time in sleep mode, and a duty cycle.

15. In a computing device including a processor and a memory, a computer-implemented method comprising:
   receiving data at a computing device currently in a sleep state that indicates that content is available to a computing device;
   determining, according to a user-defined policy that indicates the relative importance of each of a plurality of different content and events, that the content or event is important enough to wake one or more selected individual components of a main host system to respond to the content or event notification;

determining, according to a hardware wake policy that indicates a current battery level and current thermal level, that a minimum battery level threshold is currently met by the battery and that a maximal thermal level threshold is not being exceeded by the host system;

based on the battery level and thermal level determinations and based on the indication of importance in the user-defined policy, determining the extent to which the main host system is to be awoken in order to process the content or event notification, wherein only the selected individual components of the main host system necessary to process the content or event notification are to be awoken, the system being configured to selectively wake any one or more of a plurality of different individual host system components;

based on the indication of importance in the user-defined policy, waking only the determined individual components of the main host system to respond to the content or event notification, such that those components of the main host system that are not needed to process the content or event notification are not awoken; and upon determining that the content or event notification has been processed, returning the awoken components of the main host system to its sleep state.

16. The method of claim 15, wherein the determined individual components of the main host system are awoken to respond to the content or event notification based on both the battery level and thermal level determinations as well as the indication of importance in the user-defined policy.

17. A computer system comprising:

a data receiving portion of the computing device configured to receive data available to the computing device, including detecting the data while a main host system of the computing device is in a sleep state;

policy means for determining, based on a user-defined policy that indicates that indicates the relative importance of each of a plurality of different types of data, that the data is important enough to wake one or more selected individual components of the main host system to process the data, when the data receiving portion detects that the data is available to the computing device;

hardware policy means for determining, according to a hardware wake policy that indicates a current battery level and current thermal level, that a minimum battery level threshold is currently met by the battery and that a maximal thermal level threshold is not being exceeded by the host system;

determining means for determining, based on the battery level and thermal level determinations and based on the indication of importance in the user-defined policy, the extent to which the main host system is to be awoken in order to process the data, wherein only the selected individual components of the main host system necessary to process the data are to be awoken, the system being configured to selectively wake any one or more of a plurality of different individual host system components;

waking means to wake only the determined individual components of the main host system to respond to the data, such that those components of the main host system that are not needed to process the content or event notification are not awoken; and returning means to return the awoken components of the main host system to its sleep state upon determining that the data has been processed.

18. The system of claim 17, wherein a network server sends the data received by the data receiving portion of the computing device.

* * * * *